United States Patent
Ostrowski et al.

(10) Patent No.: US 10,640,137 B2
(45) Date of Patent: May 5, 2020

(54) AUTOMATIC CONTROL OF A HEATING ELEMENT IN A STEERING WHEEL OF A VEHICLE PURSUANT TO PREDICTIVE MODELING THAT RECALIBRATES BASED ON OCCUPANT MANUAL CONTROL OF THE HEATING ELEMENT

(71) Applicant: Ford Global Technologies, LLC, Dearborn, MI (US)

(72) Inventors: David Ostrowski, Northville, MI (US); Elizabeth Anne Manwell, Canton, MI (US); Mohan John, Dearborn, MI (US); William G. Herbert, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 340 days.

(21) Appl. No.: 15/900,203

(22) Filed: Feb. 20, 2018

(65) Prior Publication Data

US 2019/0256125 A1    Aug. 22, 2019

(51) Int. Cl.
*B62D 1/06* (2006.01)
*H05B 1/02* (2006.01)
*G05B 13/04* (2006.01)

(52) U.S. Cl.
CPC ............... *B62D 1/06* (2013.01); *B62D 1/065* (2013.01); *G05B 13/048* (2013.01); *H05B 1/0236* (2013.01)

(58) Field of Classification Search
CPC ........ B62D 1/065; B62D 1/06; G05B 12/048; H05B 1/0236
See application file for complete search history.

(56) References Cited

U.S. PATENT DOCUMENTS

| | | |
|---|---|---|
| 5,187,943 A | 2/1993 | Taniguchi et al. |
| 6,237,675 B1 | 5/2001 | Oehring et al. |

(Continued)

FOREIGN PATENT DOCUMENTS

WO    2016070052 A1    5/2016

OTHER PUBLICATIONS

RuleQuest Research Data Mining Tools, Release 2.07 GPL Edition (C.50 Program); http://www.rulequest.com/accessed Dec. 18, 2017, 1 page).

(Continued)

*Primary Examiner* — Thomas G Black
*Assistant Examiner* — Demetra R Smith-Stewart
(74) *Attorney, Agent, or Firm* — David Coppiellie; Price Heneveld LLP

(57) ABSTRACT

A method of controlling a heating element within a steering wheel of a vehicle comprising: presenting a vehicle comprising a steering wheel including a heating element, a controller in communication with the heating element, the controller including a Pre-established Predictive Activation Model setting forth rules governing activation of the heating element as a function of data relating to Certain Identifiable Conditions, and a user interface configured to allow the heating element to be manually activated or deactivated; collecting data relating to the Certain Identifiable Conditions; determining, by comparing the collected data to the rules of the Pre-established Predictive Activation Model, whether the collected data satisfies the rules of the Pre-established Predictive Activation Model so as to initially automatically activate the heating element; and automatically activating the heating element.

20 Claims, 12 Drawing Sheets

(56) References Cited

U.S. PATENT DOCUMENTS

| | | | |
|---|---|---|---|
| 6,454,178 | B1 | 9/2002 | Fusco et al. |
| 6,698,663 | B2 | 3/2004 | Wang et al. |
| 8,082,979 | B2 | 12/2011 | Greiner et al. |
| 8,800,644 | B2 | 8/2014 | Greiner et al. |
| 9,159,232 | B2 | 10/2015 | Ricci |
| 9,524,514 | B2 | 12/2016 | MacNeille et al. |
| 9,555,689 | B2 | 1/2017 | Sebastian et al. |
| 9,688,281 | B2 | 6/2017 | Parundekar |
| 2003/0039298 | A1 | 2/2003 | Eriksson et al. |
| 2005/0067401 | A1* | 3/2005 | Fernandez .......... B60N 2/5678 219/497 |
| 2011/0084055 | A1* | 4/2011 | Park .................. B60L 1/02 219/204 |
| 2012/0312520 | A1 | 12/2012 | Hoke et al. |
| 2015/0197136 | A1 | 7/2015 | Chen et al. |
| 2016/0223218 | A1 | 8/2016 | Barrett |
| 2016/0371641 | A1 | 12/2016 | Wilson et al. |
| 2017/0036511 | A1 | 2/2017 | Lee et al. |
| 2017/0052538 | A1 | 2/2017 | Li et al. |
| 2017/0158023 | A1 | 6/2017 | Stevanovic et al. |
| 2017/0282685 | A1 | 10/2017 | Bader et al. |
| 2019/0176568 | A1* | 6/2019 | Ostrowski .......... B60H 1/00742 |

OTHER PUBLICATIONS

Mark Hall, M5PBase. Implements Base Routines for Generating M5 Model Trees and Rules, Weka; http://weka.sourceforge.net/doc.stable/weka/classifiers/trees/M5P.html (accessed Dec. 8, 2017, 7 pages).

Frank et al., Class Random Tree, Class for Constructing a Tree That Considers K Randomly Chosen Attributes at Each Node. Performs no Pruning. Also Has an Option to Allow Estimation of Class Probabilities (or Target Mean in the Regression Case) Based on a Hold-Out Set (Backfitting), Weka; http://weka.sourceforge.net/doc.dev/weka/classifiers/trees/RandomTree.html (accessed Dec. 8, 2017, 15 pages).

Malcolm Ware, Class MultilayerPerceptron, A classified that uses backpropagation to classify instances. This Network can be built by hand, created by an algorithm or both. The network can also be monitored and modified during raining time. The nodes in this network are all sigmoid (except for when the class is numeric in which case the the Output nodes become unthresholded linear units)., Weka; http://weka.sourceforge.net/doc.stable/weka/classifiers/Functions/MultilayerPerceptron.html (accessed Dec.. 9, 2017, 19 pages).

* cited by examiner

AUTOMATIC CONTROL OF A HEATING ELEMENT IN A STEERING WHEEL OF A VEHICLE PURSUANT TO PREDICTIVE MODELING THAT RECALIBRATES BASED ON OCCUPANT MANUAL CONTROL OF THE HEATING ELEMENT

FIELD OF THE INVENTION

The present invention generally relates to the heating of a steering wheel of a vehicle.

BACKGROUND OF THE INVENTION

A vehicle typically includes a steering wheel designated for an operator occupant of the vehicle to allow the operator occupant to control the direction of travel of the vehicle. The steering wheel sometimes includes a heating element that can provide heat to an external surface of the steering wheel, which warms the hands of the operator occupant, thereby increasing comfort. The operator occupant typically has to activate and deactivate manually the heating element via buttons or dials, inconvenient for the operator occupant.

SUMMARY OF THE INVENTION

According to a first aspect of the present invention, a method of controlling a heating element within a steering wheel of a vehicle comprises: presenting a vehicle comprising a steering wheel including a heating element, a controller in communication with the heating element, the controller including a Pre-established Predictive Activation Model setting forth rules governing activation of the heating element as a function of data relating to Certain Identifiable Conditions, and a user interface configured to allow the heating element to be manually activated or deactivated; collecting data relating to the Certain Identifiable Conditions; determining, by comparing the collected data to the rules of the Pre-established Predictive Activation Model, whether the collected data satisfies the rules of the Pre-established Predictive Activation Model so as to initially automatically activate the heating element; and automatically activating the heating element.

Embodiments of the first aspect of the invention can include any one or a combination of the following features:
- the Pre-established Predictive Activation Model was formed pursuant to a classification and regression tree analysis of input data related to the Certain Identifiable Conditions collected from other operators of other vehicles;
- the Pre-established Predictive Activation Model establishes rules that are a function of at least the following Certain Identifiable Conditions: a temperature of the interior of the vehicle and a temperature outside of the vehicle;
- the Pre-established Predictive Activation Model establishes rules that are a function of at least the following additional Certain Identifiable Conditions: a level at which the climate control system in the vehicle is blowing air and a front user side temperature set point;
- the Pre-established Predictive Activation Model establishes rules that are a function of at least the following additional Certain Identifiable Conditions: a time of the day; and a temperature differential between the temperature of the interior of the vehicle and the temperature outside of the vehicle;
- when the temperature of the interior of the vehicle is below a certain temperature, the controller automatically activates the heating element pursuant to the rules of the Pre-established Predictive Activation Model as a function of data relating to at least one other of the Certain Identifiable Conditions excluding the temperature of the interior of the vehicle;
- when the passenger side temperature set point is greater than a certain value, the controller automatically activates the heating element, but when the passenger side temperature set point is less than a certain value, the controller does not automatically activate the heating element;
- according to the rules of the Pre-established Predictive Activation Model, the controller activates the heating element if a heated seat function has not been activated, but the controller does not activate the heating element if the heated seat function has been activated;
- according to the rules of the Pre-established Predictive Activation Model, the controller activates the heating element if the level at which a climate control system in the vehicle is blowing air is greater than a certain level;
- according to the rules of the Pre-established Predictive Activation Model, the controller does not activate the heating element if the level at which the climate control system in the vehicle is blowing air is less than a certain level;
- automatically deactivating the heating element pursuant to the Pre-established Predictive Activation Model, after initially automatically activating the heating element pursuant to the Pre-established Predictive Activation Model, if the collected data relating to the Certain Identifiable Conditions collected after initially automatically activating the heating element satisfy the rules of the Pre-established Predictive Activation Model for deactivation of the heating element;
- automatically reactivating the heating element pursuant to the Pre-established Predictive Activation Model, after automatically deactivating the heating element pursuant to the Pre-established Predictive Activation Model, if the collected data relating to the Certain Identifiable Conditions collected after deactivating the heating element again satisfy the rules for activation pursuant to the Pre-established Predictive Activation Model;
- a first occupant of the vehicle manually deactivating the heating element via the user interface;
- upon the first occupant manually deactivating the heating element via the user interface, recalibrating the Pre-established Predictive Activation Model into a new predictive activation model accounting for the collected data relating to the Certain Identifiable Conditions existing when the first occupant manually deactivated the heating element and establishing new rules for activation and/or deactivation of the heating element;
- the first occupant manually activating the heating element via the user interface;
- upon the first occupant manually activating the heating element via the user interface, recalibrating the new predictive activation model into a newer predictive activation model accounting for the collected data relative to the Certain Identifiable Conditions existing when the occupant manually activated the heating element and establishing new rules for activation and/or deactivation of the heating element;

the heating element being adjustable to several different levels of heating;

the controller further including a Pre-established Predictive Level Model establishing rules governing which level of the several different levels of heating the controller will initially automatically set for the heating element, the rules of the Pre-established Predictive Level Model being a function of one or more of the Certain Identifiable Conditions;

the user interface further configured to allow the first occupant to select manually the level of the several different levels of heating;

determining, by comparing the collected data to the rules of Pre-established Predictive Level Model, which level of the several different levels of heating the controller will initially automatically set for the heating element;

initially automatically setting the heating element to the determined level;

the Pre-established Predictive Level Model is formed pursuant to a multilayer perceptron classifier analysis of input data relating to the Certain Identifiable Conditions collected from other vehicles;

the first occupant manually changing the level of heating for the heating element via the user interface;

upon the first occupant manually changing the level of heating for the heating element via the user interface, recalibrating the Pre-established Predictive Level Model into a new predictive level model accounting for the collected data relative to the Certain Identifiable Conditions existing when the first occupant manually changed the level of heating and establishing new rules governing the level of heating for the heating element when the heating element is automatically activated;

determining, by comparing the collected data to the rules of the new predictive level model, which level of the several different levels of heating the controller will initially automatically set for the heating element;

removing the first occupant from using the steering wheel, occupying the vehicle with a second occupant who is using the steering wheel, recognizing that the second occupant is different than the first occupant, and collecting data relative to the identifiable conditions while the second occupant is using the steering wheel;

determining, by comparing only the data collected while the second occupant is using the steering wheel, and not the data collected when the first occupant was using the steering wheel, to the rules of the Pre-established Predictive Activation Model, whether data collected satisfy the rules of the Pre-established Predictive Activation Model so as to initially automatically activate the heating element; and initially automatically activating the heating element while the second occupant is using the steering wheel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
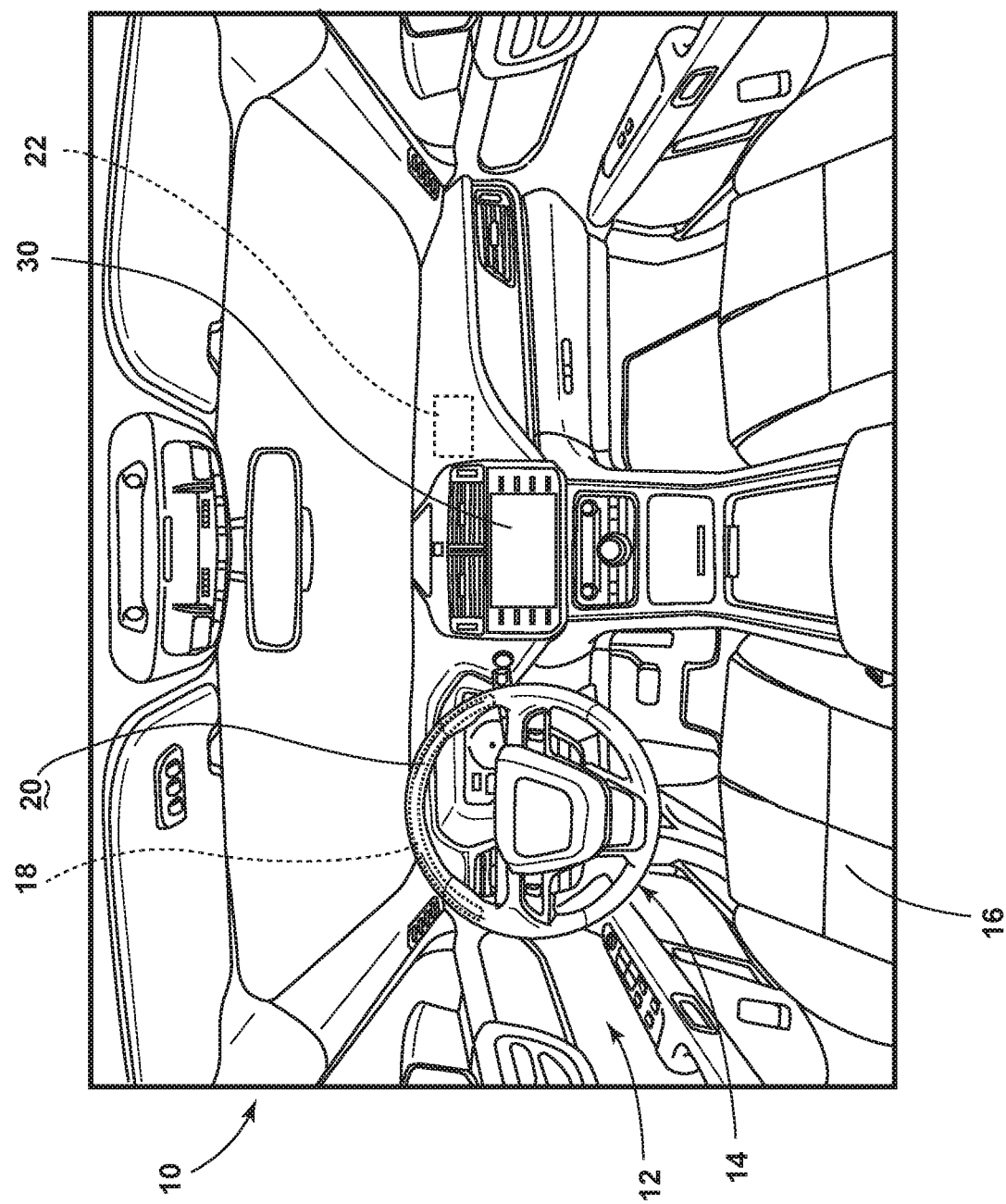
FIG. 1 is a perspective view of an interior of a vehicle, illustrating a steering wheel that includes a heating element to provide heating to an external surface of the steering wheel, a controller, and a user interface.

Referring to FIG. 1, a vehicle 10 includes an interior 12. A steering wheel 14 is disposed in the interior 12. The steering wheel 14 allows an operator (not illustrated) of the vehicle 10, such as while sitting in a seating assembly 16, to control the direction of movement of the vehicle 10 during use. The steering wheel 14 includes a heating element 18 and an external surface 20. The heating element 18 can be any element that increases the temperature of the external surface 20 of the steering wheel 14 upon command. The heating element 18 can be disposed below the external surface 20 of the steering wheel 14. The heating element 18 can be a heating mechanism for imparting heat, such as wires resisting electrical current and producing heat, or a Peltier thermoelectric device that is able to produce heat, among other options. The heating element 18 can be adjustable to provide several different levels of heating. For example, the heating element 18 can provide heating of comparatively high, medium, or low levels.

Figure 2:
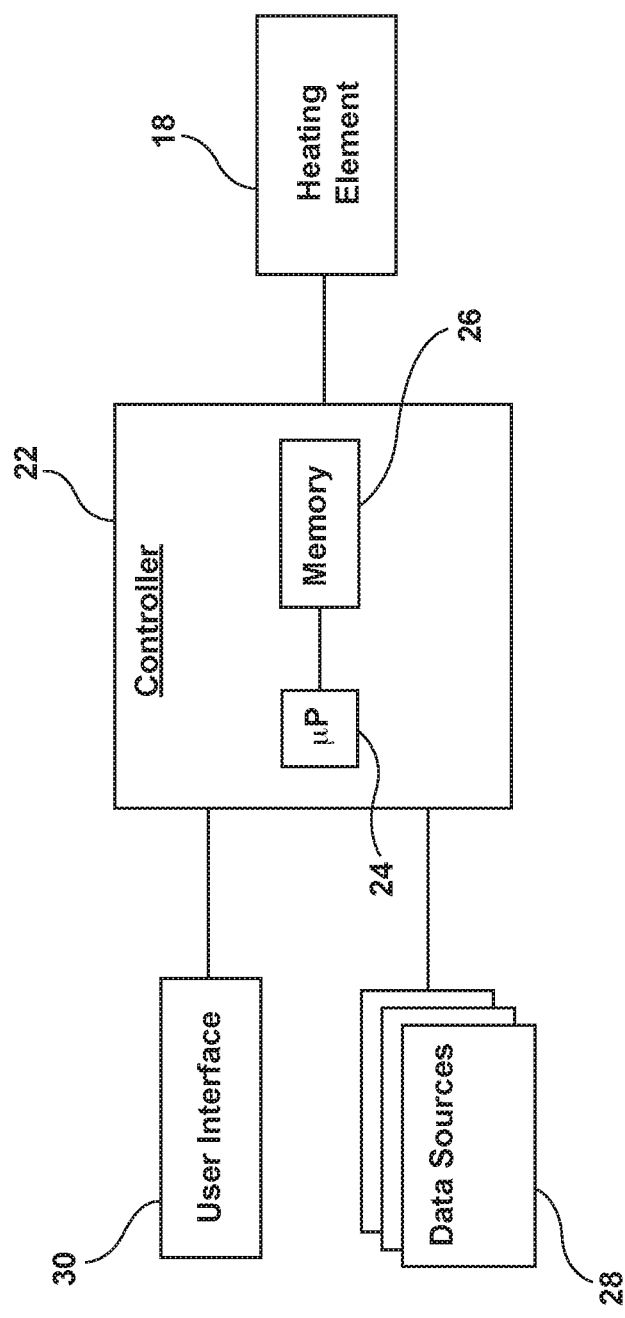
FIG. 2 is a schematic diagram of the controller of FIG. 1, illustrating that the controller accepts input from various data sources and the user interface and uses these input sources to automatically control the activation/deactivation of the heating element and the level at which the heating element is imparting heat.

Referring now to FIG. 2, the vehicle 10 further includes a controller 22. The controller 22 is in communication with the heating element 18. The controller 22 controls whether the heating element 18 is activated (i.e., to impart heat to the external surface 20 of the steering wheel 14) and how aggressively (i.e., what level, such as high, medium, or low) the heating element 18 is imparting heat. The controller 22 can include a microprocessor 24 to execute programs, such as those used to control the heating element 18, stored in memory 26.

The controller 22 includes a Pre-established Predictive Activation Model setting forth rules that govern whether the controller 22 will initially automatically activate the heating element 18 to impart heat to the external surface 20 of the steering wheel 14 without the input or instruction of the operator or other occupant of the vehicle 10. The Pre-established Predictive Activation Model(s) can be stored in the memory 26. The Pre-established Predictive Activation Model is generated as a consequence of analyzing data collected from users of other vehicles (hereinafter, "Test Vehicles") and the conditions existing when those other users manually activated or deactivated the heating element 18 disposed in the steering wheel 14 of those vehicles. The general analysis concerns the question of what conditions existed when the users of the Test Vehicles activated the heating element 18 of the steering wheel 14 to impart heat. The identification of those conditions, along with monitoring of present conditions experienced by the vehicle 10, can be utilized to predict when a user of the steering wheel 14 of the vehicle 10 would desire to have the heating element 18 of the steering wheel 14 activated to impart heat and then automatically activate the heating element 18 to do so without the user manually instructing the controller 22 to activate the heating element 18. In other words, the Pre-established Predictive Activation Model is formed pursuant to an analysis of input data collected from the Test Vehicles relating to numerous conditions (hereinafter, "Certain Identifiable Conditions"). The Pre-established Predictive Activation Model is a function of those Certain Identifiable Conditions. The Pre-established Predictive Activation Model and the Certain Identifiable Conditions are discussed in greater detail below.

The controller 22 further includes a Pre-established Predictive Level Model for heating stored in the memory 26. The Pre-established Predictive Level Model establishes rules governing which level of the several different levels of heating the controller 22 will initially automatically set for the heating element 18. In other words, the Pre-established Predictive Level Model establishes rules governing which level of heating (i.e., how aggressive of heating) the controller 22 will automatically set for the heating element 18 when and while the controller 22 automatically activates the heating element 18 to impart heat. The rules of the Pre-established Predictive Level Model are a function of the Certain Identifiable Conditions. In other words, which level the controller 22 assigns pursuant to the rules of the Pre-established Predictive Level Model depends on the Certain Identifiable Conditions the vehicle 10 is then experiencing. The Pre-established Predictive Level Model likewise is discussed further below.

The controller 22 receives input from one or more data sources 28 within the vehicle 10 concerning the Certain Identifiable Conditions. The one or more data sources 28 can be sensors and/or settings, among other things. For example, one data source 28 could be a temperature sensor that provides ambient (outside the vehicle 10) temperature to the controller 22. Another data source 28 could be a clock providing time data to the controller 22. The data source 28 can be external to the vehicle 10, such as location data via a global positioning system (GPS). As discussed further below, the controller 22 utilizes data concerning the Certain Identifiable Conditions to control the heating element 18 according to the Pre-established Predictive Activation Model, the Pre-established Predictive Level Model, and subsequent refinements thereof caused by user manual override/control of the heating element 18, as discussed below.

Figure 3A:
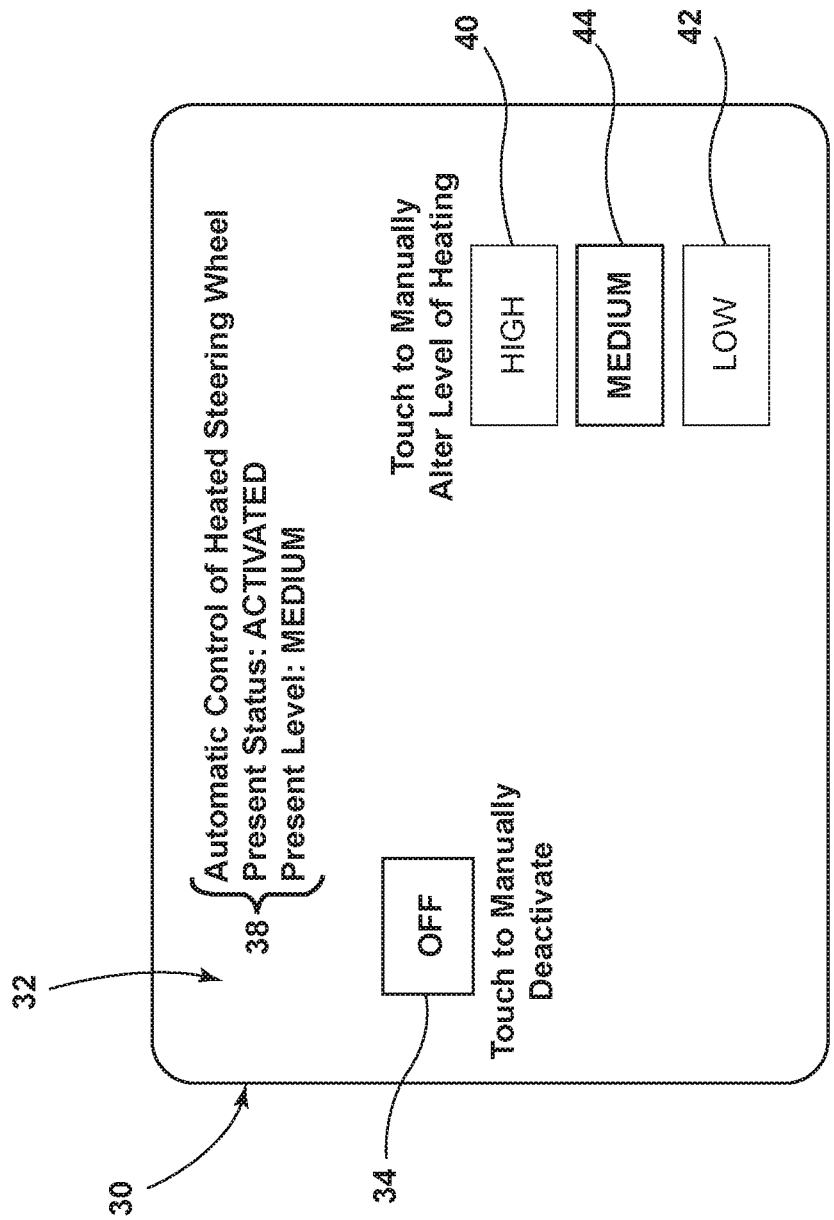
FIG. 3A is a front view of an exemplary user interface of FIG. 1, illustrating a touch screen display providing notification that the controller has automatically activated the heating element and the level of heating, and providing a touchable "OFF" button allowing an occupant to manually deactivate the heating element and touchable buttons to manually alter the level of heating.
Figure 3B:
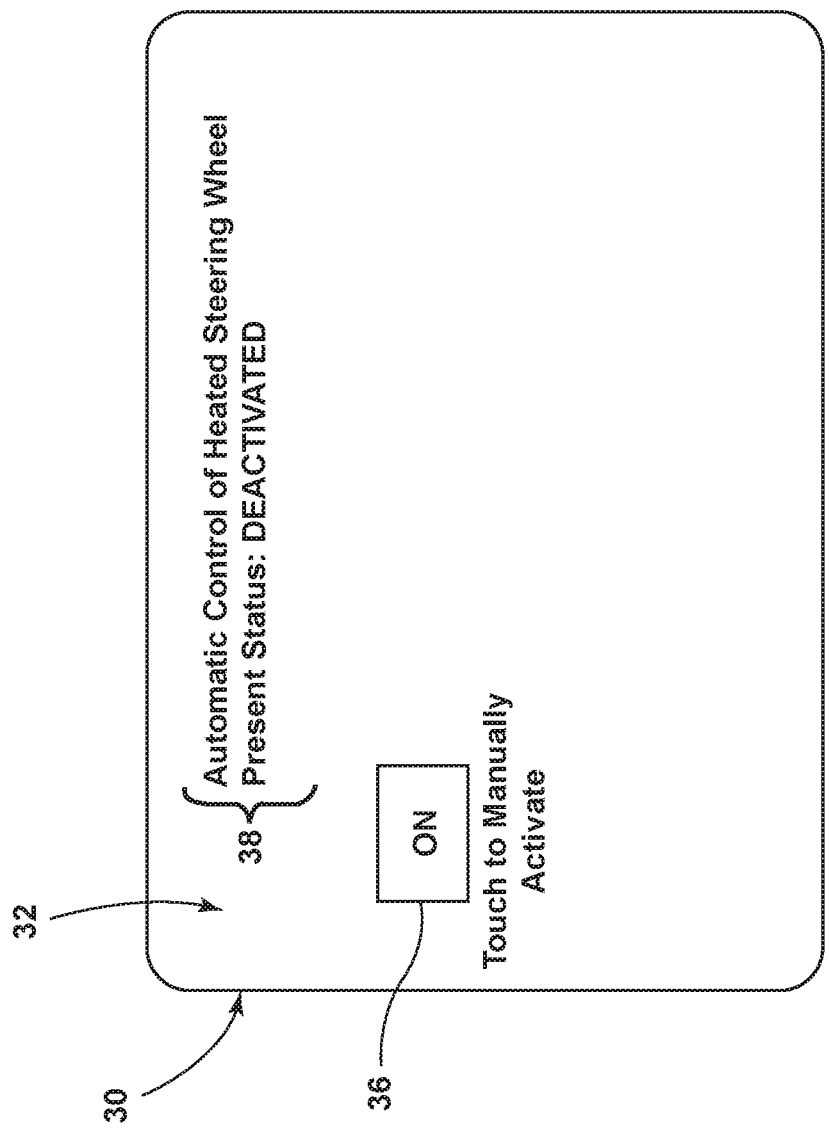
FIG. 3B is a front view of the exemplary user interface of FIG. 1, illustrating the touch screen display providing a notification that the controller has not automatically activated the heating element and providing a touchable "ON" button allowing the occupant to manually activate the heating element.

Referring now to FIGS. 3A and 3B, the vehicle 10 further includes a user interface 30 in communication with the controller 22. The user interface 30 can be located in the vehicle 10 such that the user of the steering wheel 14 (who can occupy the seating assembly 16) can interact with the user interface 30. For example, the user interface 30 can be a touch screen display 32, a knob, a switch, and/or a voice-manipulable user interface, among other things. The user interface 30 is configured to allow the user of the steering wheel 14 to manually activate the heating element 18 if the controller 22 has not activated the heating element 18 to impart heating as the user desires. In addition, the user interface 30 is configured to manually deactivate the heating element 18 if the controller 22 has activated the heating element 18 to impart heating contrary to the user's desires. For example, the user interface 30 could be the touch screen display 32 with an option (e.g., a button 34 labeled "OFF"), allowing the user of the steering wheel 14 or some other occupant of the vehicle 10 to deactivate the heating element 18 of the steering wheel 14 that the controller 22 has automatically activated according to the Pre-established Predictive Activation Model to impart heat. If the user presses the "OFF" button 34, the controller 22 accepts the interaction as input and deactivates the heating element 18 from imparting heat. Similarly, the touch screen display 32 can include an option (e.g., a button 36 labeled "ON"), allowing the user of the steering wheel 14 to activate the heating element 18 of the steering wheel 14 that the controller 22 has not automatically activated following the rules of the Pre-established Predictive Activation Model (or subsequently revised iterations thereof, as discussed below). If the user presses the button 36 labeled "ON," the controller 22 accepts the interaction as input and activates the heating element 18. For example, if the user desires the heating element 18 to impart heat to the steering wheel 14, but the controller 22 has not automatically caused the heating element 18 to do so pursuant to the Pre-established Predictive Activation Model, then the user could navigate to the touch screen display 32 to the proper option screen and press the button 36 labeled "ON," and the controller 22 then activates the heating element 18 to impart cooling. The controller 22 can cause the touch screen display 32 to provide a notification 38 to the user as to the present status of the automatically controlled heating element 18 of the steering wheel 14. For example, as illustrated in FIG. 3A, the "ON" button 36 can be presented to the user when the notification 38 notifies the user that the heating element 18 is presently automatically deactivated (not activated). Similarly, as illustrated in FIG. 3B, the "OFF" button 34 can be presented to the user as a touchable option when the notification 38 notifies the user that the heating element 18 is presently automatically activated.

In addition, the user interface 30 is configured to allow the occupant of the seating assembly 16 to manually select the level of the several different levels of temperature altering. For example, the touch screen display 32 can have an option allowing the user of the steering wheel 14 to manually select a relatively high level of heating (e.g., a button 40 labeled "HIGH"), a relatively low level of temperature altering (e.g., a button 42 labeled "LOW"), or a level of temperature altering between high and low levels (e.g., a button 44 labeled "MEDIUM"). The touch screen display 32 options might be "3," "2," and "1" instead of "HIGH," "MEDIUM,"

and "LOW," respectively. If the user presses one of the buttons 40, 42, 44, and the heating element 18 is not already heating at that level, then the controller 22 accepts the interaction as input and adjusts the level of the heating element 18 accordingly, overriding the level at which the controller 22 automatically set for the heating element 18 pursuant to the Pre-established Predictive Level Model. The user's interaction with the user interface 30 in this manner to override the controller's 22 automatic control of the heating element 18 affects the controller's 22 subsequent automatic control thereof, as discussed in greater detail below.

Figure 4:
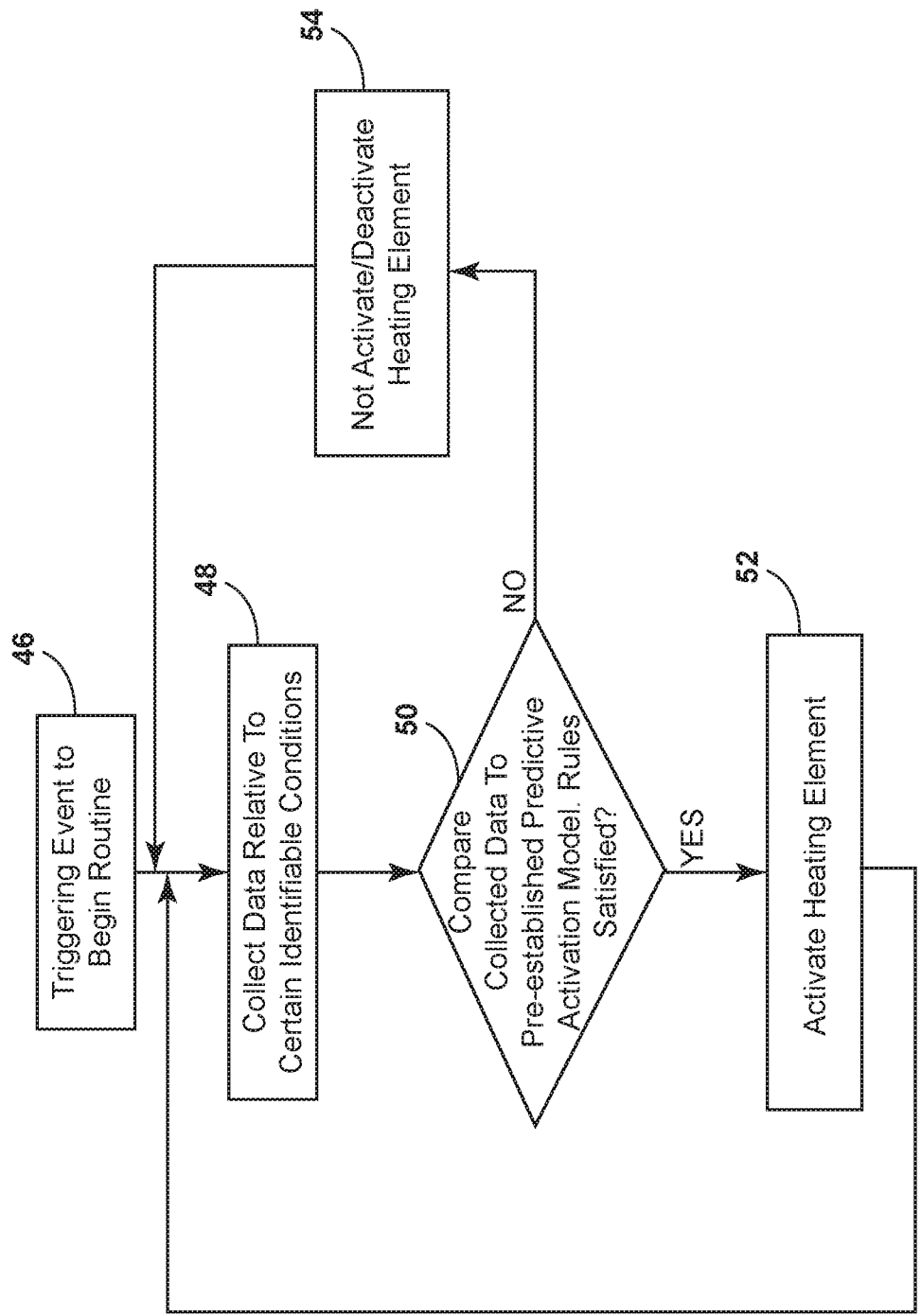
FIG. 4 is a process diagram illustrating the controller, after a triggering event (such as the starting of the vehicle engine), collecting (accepting as input) data from the various data sources relating to Certain Identifiable Conditions, comparing the data to rules established by a Pre-established Predictive Activation Model governing the activation and deactivation of the heating element, and either activating the heating element or not activating/deactivating the heating element according to the rules.
Figure 5A:
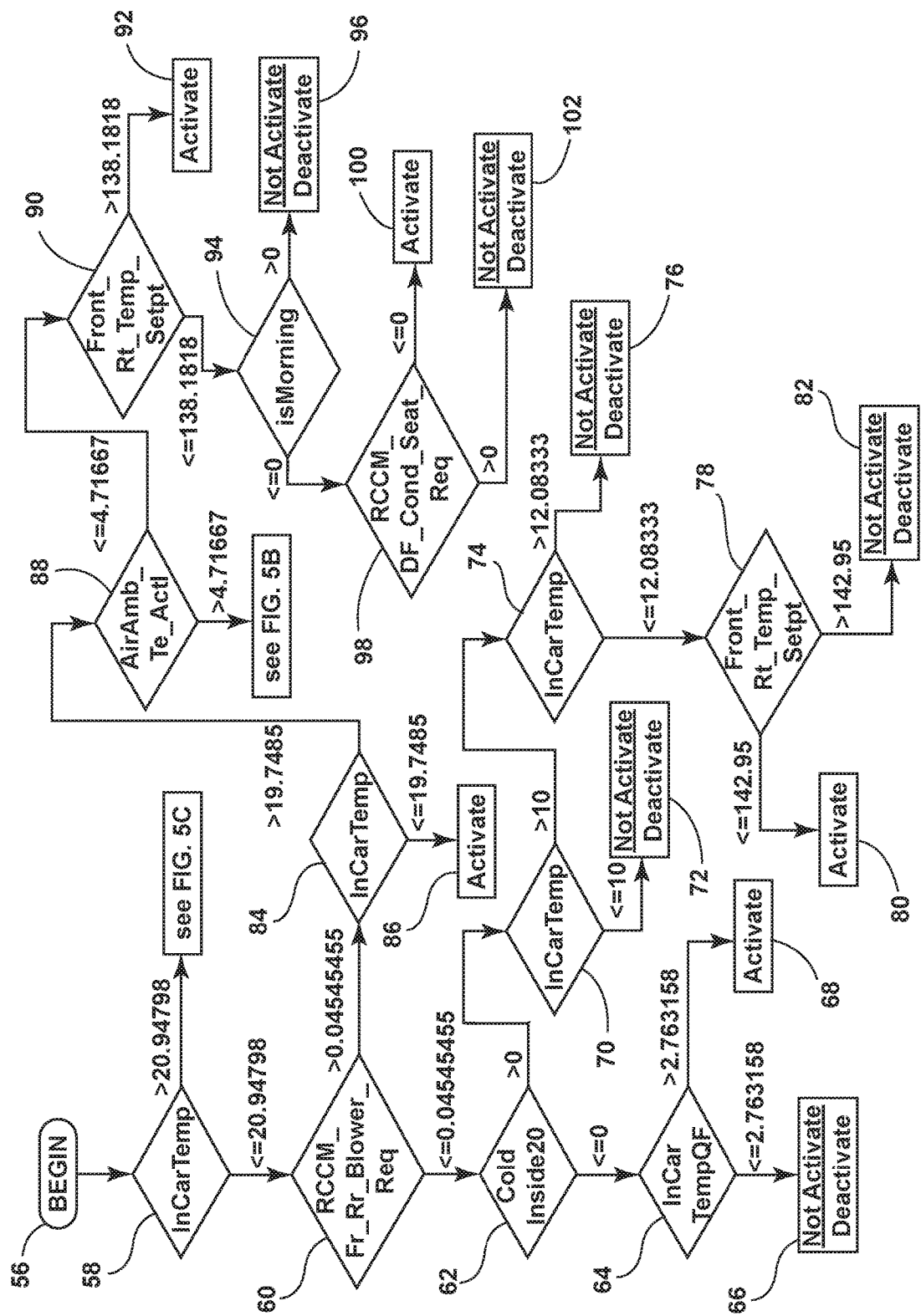
FIGS. 5A-5G are schematic diagrams illustrating the rules of a first example Pre-established Predictive Activation Model providing the data relating to the Certain Identifiable Conditions that must exist for the controller to automatically activate the heating element to impart heat and to not activate/automatically deactivate the heating element.
Figure 5B:
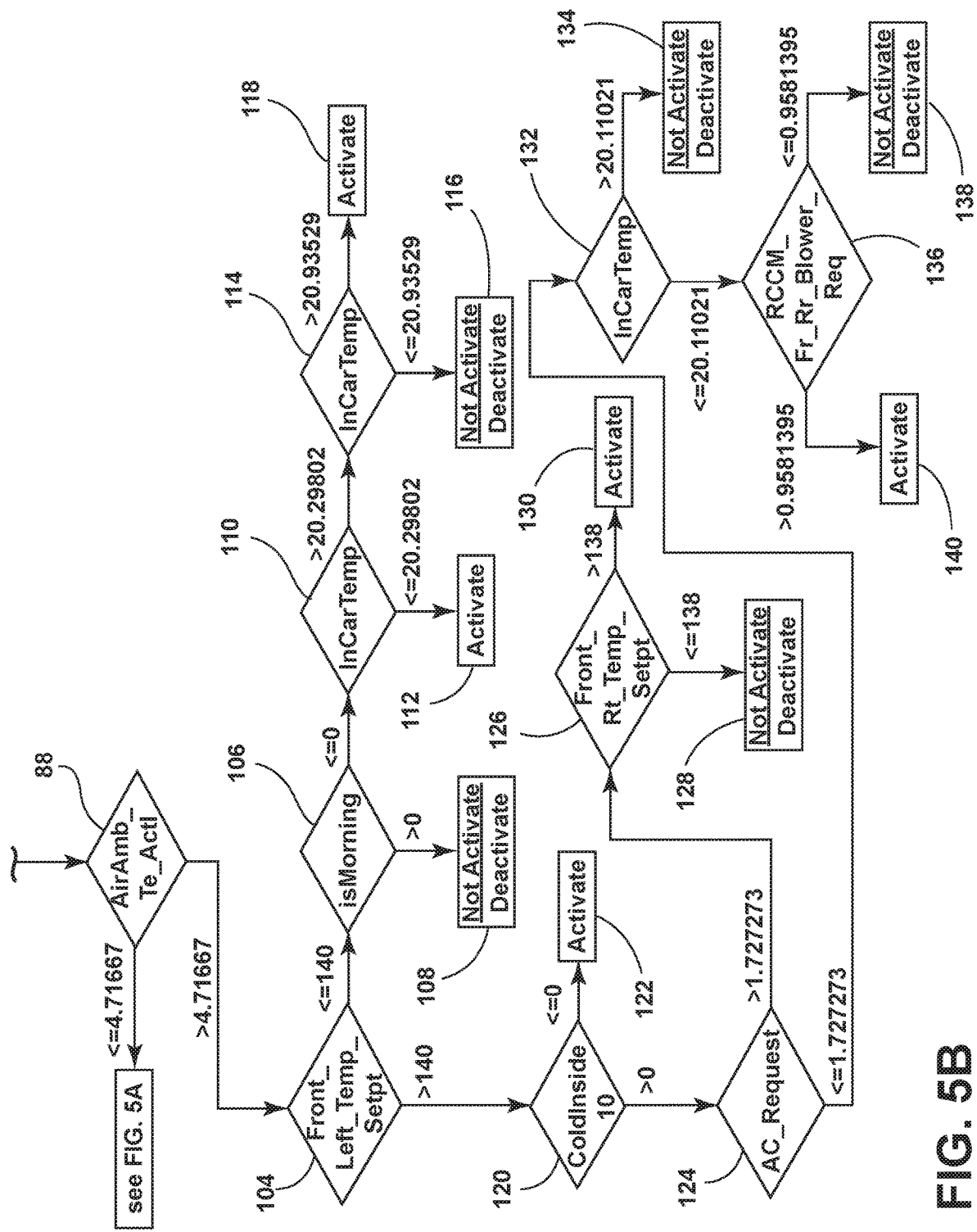
Figure 5C:
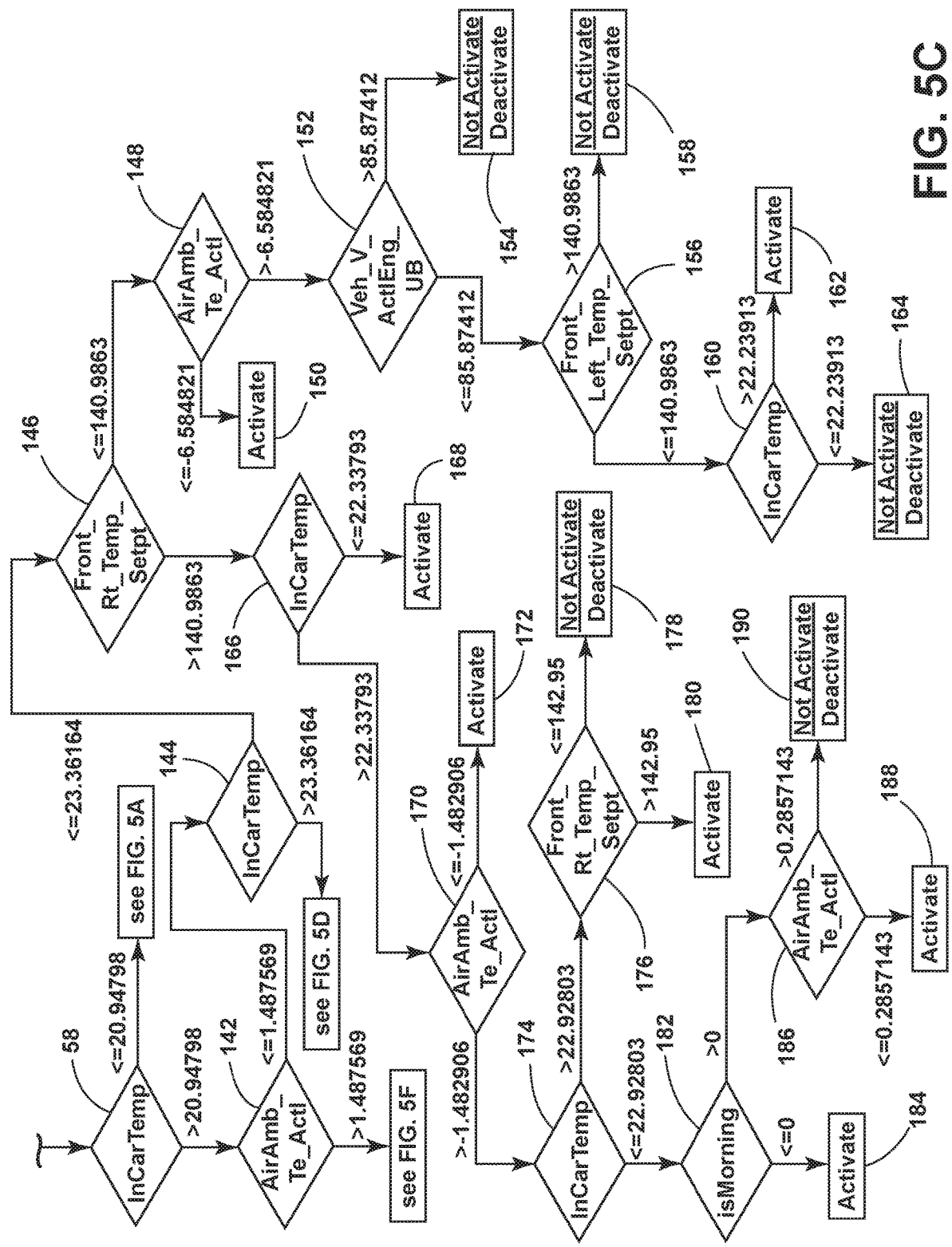
Figure 5D:
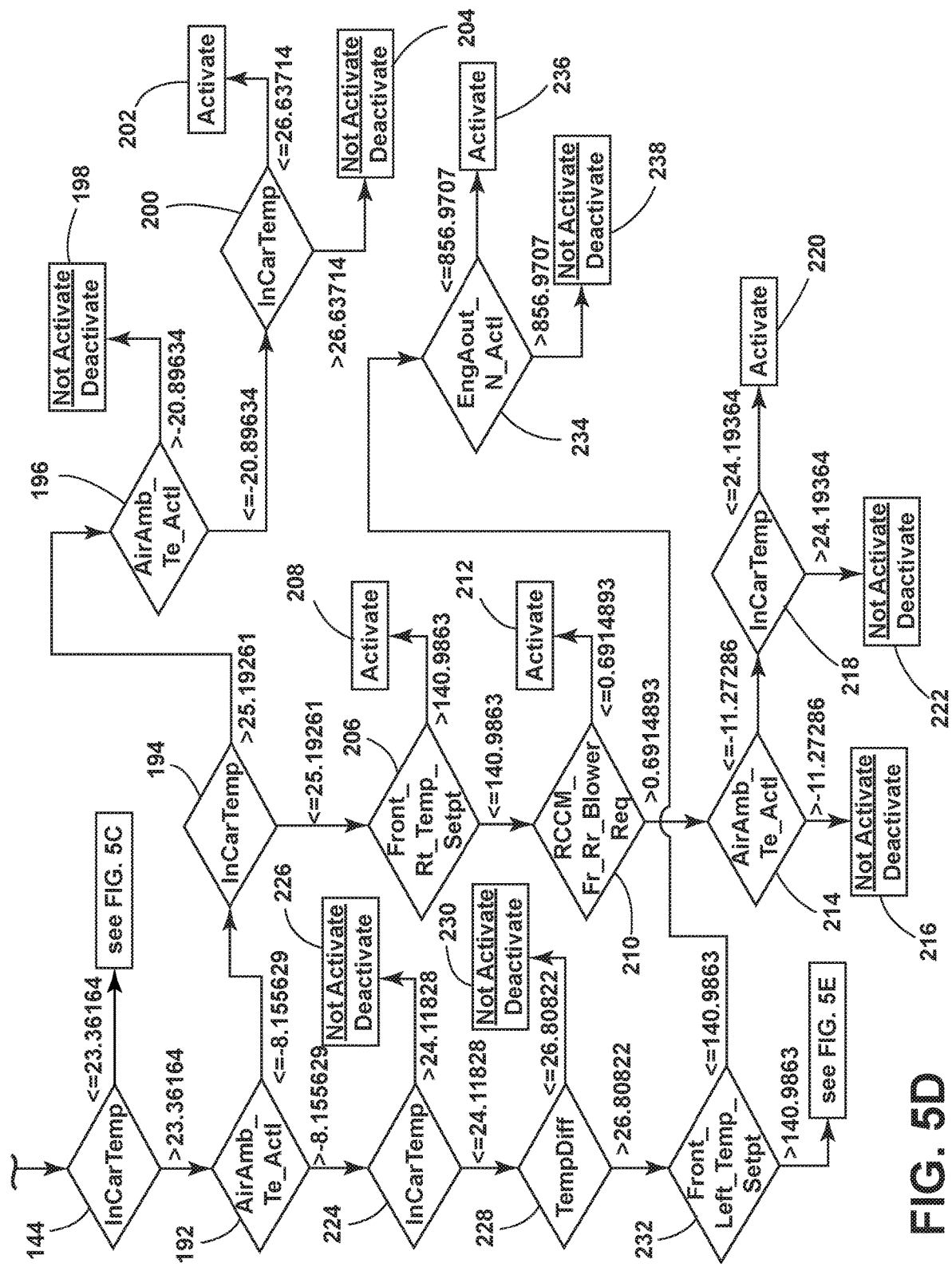
Figure 5E:
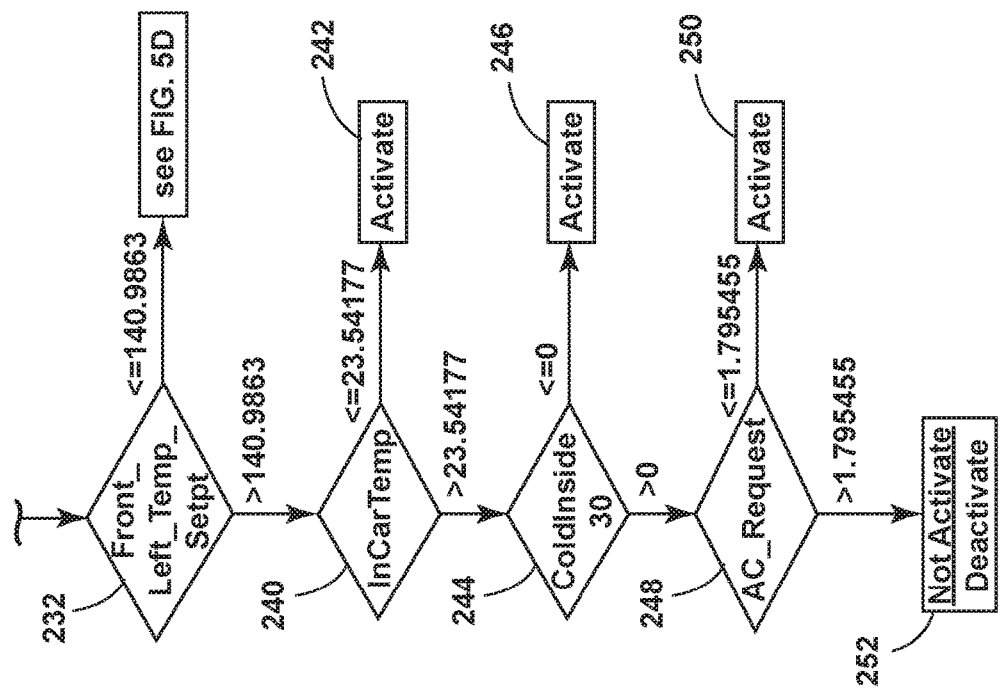
Figure 5F:
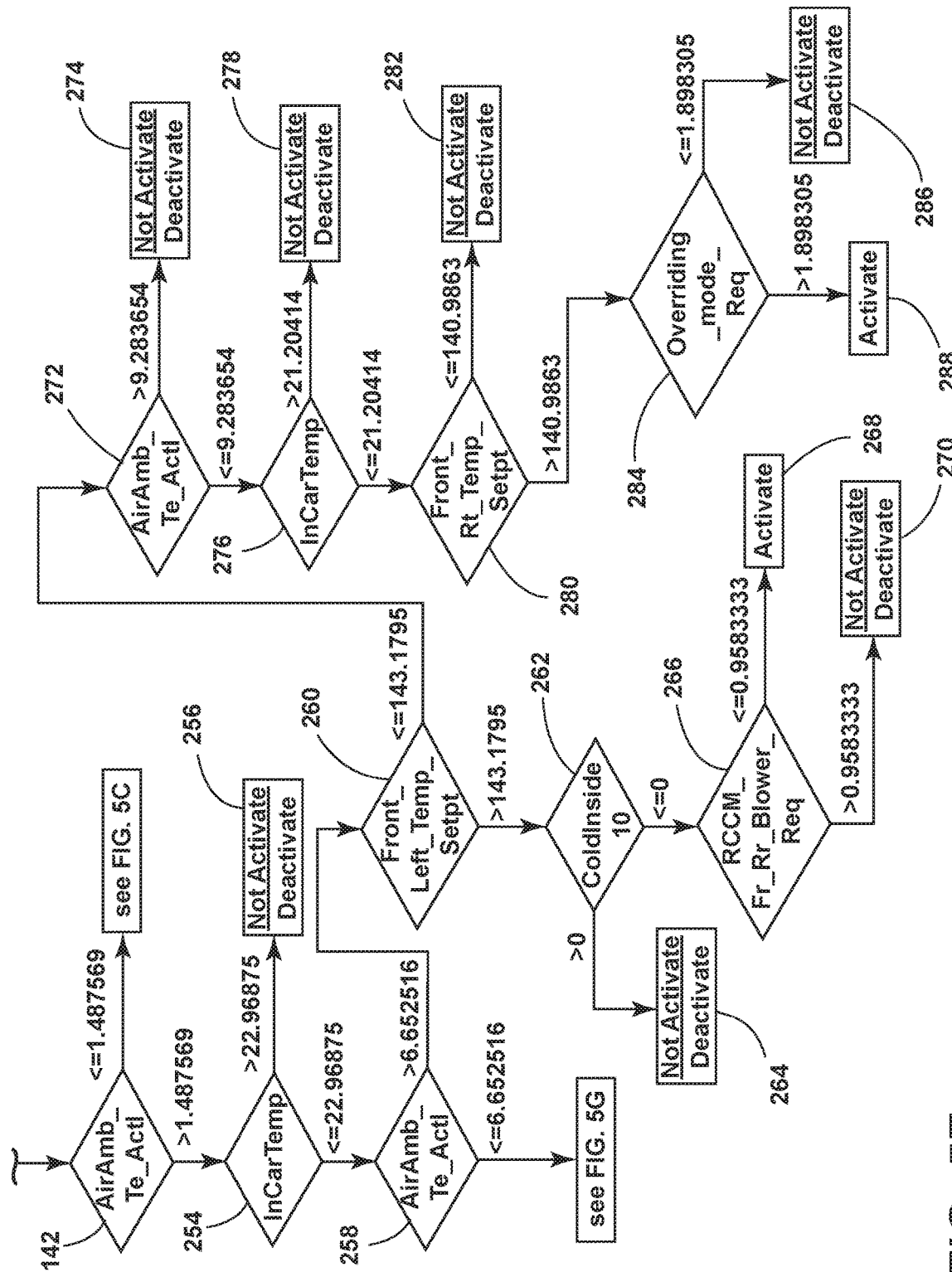
Figure 5G:
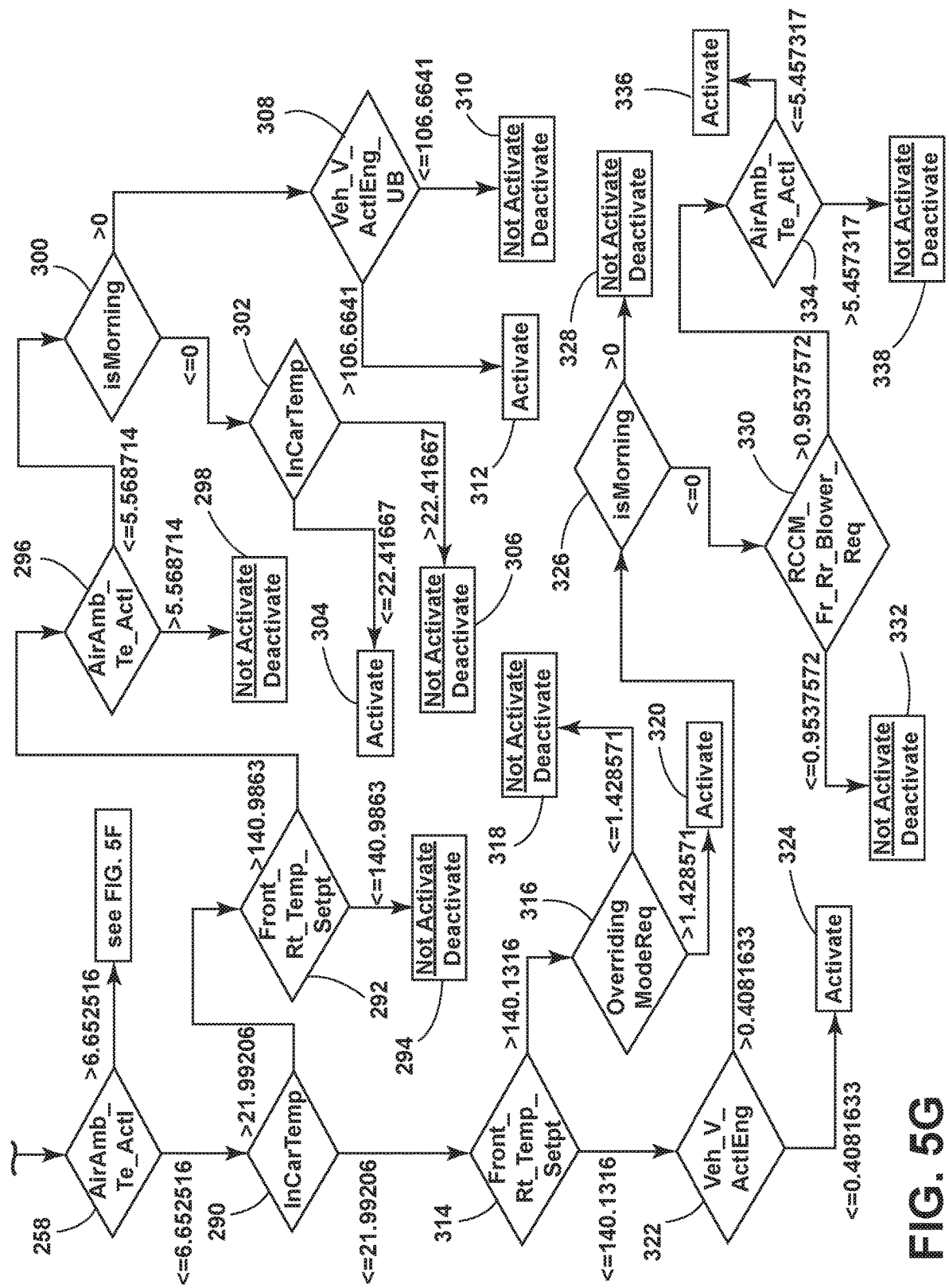

Referring now to FIG. 4, the above vehicle 10, including the steering wheel 14 with the heating element 18, the controller 22, and the user interface 30, can be utilized in performing a novel method of controlling the heating element 18. The novel method (at step 46) can include a triggering event that causes the controller 22 to begin the rest of the method (e.g., to begin the routine). The triggering event can be the powering on of the vehicle 10 (e.g., engine ignition), a preset time of the day (i.e., five minutes before the most common user begins the user's morning commute), the vehicle 10 detecting the presence of the user in the seating assembly 16 (such as through capacitive or weight sensors), the vehicle 10 detecting a hand or hands of the user on the steering wheel 14 (such as through capacitive sensors or otherwise), among other such potential triggering events. The novel method (at step 48) includes collecting data relating to the Certain Identifiable Conditions (from the data sources 28), (at step 50) determining (by comparing the collected data to the rules of the Pre-established Predictive Activation Model governing activation) whether the collected data satisfies the rules of the Pre-established Predictive Activation Model so as to initially automatically activate the heating element 18, and, if so, (at step 52) initially automatically activating the heating element 18. If comparing the collected data to the Pre-established Predictive Activation Model reveals that the rules for activation of the heating element 18 are not satisfied, then (at step 54) the heating element 18 is not activated (or deactivated if already automatically activated) and the method can proceed back to step 48 and the data collection continues. Stated another way, even if the collected data satisfies the rules of the Pre-established Predictive Activation Model for activation of the heating element 18 at one point in time, the method can further include proceeding back to step 48 to continue data collection and subsequently to determine whether the collected data satisfies the rules of the Pre-established Predictive Activation Model for deactivation of the heating element 18, resulting in deactivation of the heating element 18 at step 54. This loop is continuous, and the controller 22 constantly collects data to determine whether the heating element 18 is to be activated or not activated/deactivated according to the rules of the Pre-established Predictive Activation Model.

We now further discuss the Test Vehicles and the data collected therefrom relating to the Certain Identifiable Conditions, analysis of which data forms the pre Pre-established Predictive Activation Model and the Pre-established Predictive Level Model (and subsequent recalibrations or iterations thereof). Data was collected from a number of Test Vehicles with a heating element 18 to impart heat to a steering wheel 14.

The data was narrowed down to data related to a number of conditions forming the Certain Identifiable Conditions, which were thought to have some relation to a user's decision to when to activate (and deactivate) the heating element 18 and at what level (how aggressive) the heating element 18 would impart heat. Those Certain Identifiable Conditions include: whether the user has activated heating of the seating assembly 16 ("RCCM_DF_Cond_Seat_Req"); front user/operator side temperature set point ("Front_Left_Temp_Setpt"); front passenger side temperature set point ("Front_Rt_Temp_Setpt"); (these last two temperature set points refer to the set point temperature of the blown air directed toward the seating assembly 16 and a seating assembly adjacent to the seating assembly 16 in a first row of seating, respectively); whether air conditioning has been activated ("AC_Request"); whether a rear window defrost has been activated ("Overriding_ModeReq"); the temperature outside of the vehicle 10, i.e., ambient temperature ("AirAmb_Te_Actl," "AirAmb_Te_Actl_UB"); the level at which the climate control system in the vehicle 10 is blowing air ("RCCM_Fr_Rr_Blower_Req"); the temperature of the interior 12 of the vehicle 10 ("InCarTemp," "InCarTempQF"); the vehicle 10 speed ("Veh_V_Actl Eng_UB," "Veh_V_ActlEng"); an engine speed (such as revolutions per minute) ("EngAout_N_Actl," "EngAout_N_Actl_UB"); and the time of the day, which may be expressed as the hour of the day ("hour"). (The values for front passenger side temperature set point ("Front_Rt_Temp_Setpt") and front operator side temperature set point ("Front_Left_Temp_Setpt") used herein in the example below are without units, with a range between 119 and 171. That range linearly correlates with 60 degrees F. and 85 degrees F., respectively. Thus, a value of "Front_Rt_Temp_Setpt<=154.9836" would roughly equate to 77.3 degrees Fahrenheit.)

The identifiers above noted in quotations within parentheses are provided to help decipher the example Pre-established Predictive Activation Model reproduced below. Several identifiers may relate to the same concept. For example, "AirAmb_Te_Actl" and "AirAmb_Te_Actl_UB" both relate to the temperature outside of the vehicle 10 (i.e., ambient temperature). Before analyzing the data relating to the Certain Identifiable Conditions to generate the Pre-established Predictive Activation Model and the Pre-established Predictive Level Model, it may be advantageous to consolidate the several identifiers into one identifier. For example, data with the identifier "AirAmb_Te_Act_UB" may essentially be duplication of "AirAmb_Te_Act" and may be removed entirely from the data before analyzing to generate the Pre-established Predictive Activation Model and the Pre-established Predictive Level Model.

Other analyses of the data from the Test Vehicles or other test vehicles could result in the Certain Identifiable Conditions including sunlight level, and trip-related statistics, such as trip length, trip frequency, trip characterization (such as commute versus leisure), GPS positioning (such as latitude and longitude), road grade, altitude, city versus country driving, highway versus city road, torque, braking, idle time, and other time-related concepts, such as minute, second, date, day of the week (Monday, Tuesday, etc.), and season.

Data related to some of the Certain Identifiable Conditions can be manipulated to make the data more meaningfully predictive for the Pre-established Predictive Activation Model and the Pre-established Predictive Level Model. In this regard, some of the Certain Identifiable Conditions can be derived from other Certain Identifiable Conditions and further analyzed for predictive power for the Pre-established Predictive Activation Model(s) and the Pre-established Predictive Level Model(s). For example, the Certain Identifiable Conditions of the in-vehicle 10 temperature ("InCarTemp") and the ambient temperature ("AirAmb_Te_Actl")

can be used to calculate the Certain Identifiable Condition of the temperature differential ("tempDiff") between those two temperatures.

Similarly, one or more Certain Identifiable Conditions can be calculated to try to capture the generalized condition of a "cool" day (ambient temperature less than 60 degrees Fahrenheit) where the in-vehicle 10 temperature has not "warmed up" yet and the degree to which the in-vehicle 10 temperature has not "warmed up" yet. For example, in the Pre-established Predictive Activation Model provided below, the Certain Identifiable Conditions "coldInside40," "coldInside30," "coldInside20," and "coldInside10" were all defined as true or false conditions generated from other Certain Identifiable Conditions. The Certain Identifiable Condition "coldInside40" is TRUE (is provided a value of 1, i.e., ">0," in the example Pre-established Predictive Activation Model below) when the ambient temperature ("AirAmb_Te_Actl") is less than 60 degrees Fahrenheit and the temperature differential ("tempDiff" explained above) is less than 40 degrees Fahrenheit. Otherwise, "coldInside40" is FALSE (is provided a value of 0, i.e., "<=0," in the example Pre-established Predictive Activation Model below). The Certain Identifiable Condition "coldInside30" is TRUE (is provided a value of 1, i.e., ">0," in the example Pre-established Predictive Activation Model below) when the ambient temperature ("AirAmb_Te_Actl") is less than 60 degrees Fahrenheit and the temperature differential ("tempDiff" explained above) is less than 30 degrees Fahrenheit. Otherwise, "coldInside30" is FALSE (is provided a value of 0, i.e., "<=0," in the example Pre-established Predictive Activation Model below). The Certain Identifiable Condition "coldInside20" is TRUE (is provided a value of 1, i.e., ">0," in the example Pre-established Predictive Activation Model below) when the ambient temperature ("AirAmb_Te_ Actl") is less than 60 degrees Fahrenheit and the temperature differential ("tempDiff" explained above) is less than 20 degrees Fahrenheit. Otherwise, "coldInside20" is FALSE (is provided a value of 0, i.e., "<=0," in the example Pre-established Predictive Activation Model below). The Certain Identifiable Condition "coldInside10" is TRUE (is provided a value of 1, i.e., ">0," in the example Pre-established Predictive Activation Model below) when the ambient temperature ("AirAmb_Te_Actl") is less than 60 degrees Fahrenheit and the temperature differential ("tempDiff" explained above) is less than 10 degrees Fahrenheit. Otherwise, "coldInside10" is FALSE (is provided a value of 0, i.e., "<=0," in the example Pre-established Predictive Activation Model below). Thus, all of these defined conditions will be FALSE when the ambient temperature ("Air Amb_Te_Actl") is 60 degrees Fahrenheit or greater (i.e., a "warm" day), a day perhaps when a user would not want the heating element 18 activated. Further, "coldInside10" might capture (be TRUE, ">0") a generalized scenario of a "cool" day (below 60 degrees Fahrenheit) where the vehicle 10 interior 12 has not "warmed up" yet (thus, the "tempDiff" being less than 10 degrees Fahrenheit), a scenario perhaps when a user would want the heating element 18 activated. Although "coldInside20," "coldInside30," and "coldInside40" will also be TRUE (">0") under the same generalized scenario, the conditions "coldInside20," "coldInside30," and "coldInside40" will sequentially begin to turn FALSE ("<=0") as the vehicle 10 interior 12 "warms up," causing the temperature differential ("tempDiff") between the in-vehicle 10 temperature ("InCarTemp") and the ambient temperature ("AirAmb_Te_Actl") to rise. For example, as the interior 12 "warms up," the temperature differential ("tempDiff") might rise from 9 to 21 degrees, in which case "coldInside10" and "coldInside20" would turn from TRUE to FALSE as 21 degrees is greater than both 10 degrees and 20 degrees.

Further, Certain Identifiable Conditions identifying whether the user requested the vehicle 10 to heat the interior 12 with low, medium, or high blower speed when activating the heating element 18 ("turnOnHeat1," "turnOnHeat2," "turnOnHeat3," respectively) was derived from the Certain Identifiable Conditions of the operator side temperature setting ("Front_Left_Temp_Setpt") and the level at which the vehicle's climate control system is blowing air ("RCCM_Fr_Rr_Blower_Req"). Finally, in the illustrative example below, the Certain Identifiable Condition of whether it is morning ("isMorning") was derived from time data, as was the Certain Identifiable Condition of whether the season is the summer season ("isSummerx").

In general, by analyzing data related to the Certain Identifiable Conditions from the Test Vehicles, it can be determined what the Certain Identifiable Conditions were when the user of a Test Vehicle made the decision to activate the heating element 18 of the steering wheel 14 and made the decision to deactivate the heating element 18. The Pre-established Predictive Activation Model and the Pre-established Predictive Level Model can then be formed, establishing rules as a function of the data related to the Certain Identifiable Conditions that satisfied a certain percentage of instances when the users of the Test Vehicles made the decision to activate/deactivate the heating element 18, as the case may be. In other words, by modeling past user behavior demonstrated in the Test Vehicles, the Pre-established Predictive Activation Model and the Pre-established Predictive Level Model can be used to predict the future desires of the user in the vehicle 10 regarding activation/deactivation of the heating element 18 (and level of temperature altering) and automatically control the activation/deactivation and level management thereof.

The Pre-established Predictive Activation Model and the Pre-established Predictive Level Model can be derived from the data related to the Certain Identifiable Conditions that were collected from the Test Vehicles en masse. Alternatively, the data related to the Certain Identifiable Conditions collected from the Test Vehicles can be first segmented (such as into 3 segments, hereinafter "Segments") based on criteria, such as operator type (such as a primarily city driver, a primarily highway driver, an "aggressive" operator, etc.). Separate Pre-established Predictive Activation Models and the Pre-established Predictive Level Models can be generated for each Segment, that is, for each operator type, using data generated only by the Test Vehicle of a particular Segment. In other words, only data from the Test Vehicles of a primarily city driver Segment would be utilized to generate a Pre-established Predictive Activation Model and a Pre-established Predictive Level Model for the primarily city driver Segment. If the user of the vehicle 10 is identified as belonging to the primarily city driver Segment, then the controller 22 would utilize the Pre-established Predictive Activation Model and the Pre-established Predictive Level Model generated from the primarily city driver Segment of the Test Vehicles to govern future automatic activation/deactivation of the heating element 18 of the vehicle 10. The assumption is that one type of operator will exhibit different patterns of activating and deactivating the heating element 18 than another type of operator. For example, one Pre-established Predictive Activation Model can be derived for one type of operator and another Pre-established Predictive Activation Model can be derived for another type of operator, and so on. Criteria that can be utilized to segment the data collected from the Test Vehicles include average trip length for each of the Test Vehicles, the standard deviation of the trip length, the average number of trips per unit of time such as per day, the number of trips that might be considered "short," such as under two miles, the amount of highway miles the Test Vehicle has been driven, the amount of non-highway miles the Test Vehicle has been driven, and the ratio between the latter two. Other criteria that can be utilized to segment the data collected from the Test Vehicles further include those that can relate to how "aggressive" the particular Test Vehicle has been driven, such as torque, load, vehicle speed, engine revolutions per minute, fuel economy, or how often the driver coasted (that is, how often the vehicle moved without the operator either causing the vehicle to accelerate or decelerate through braking). The segmentation of the data collected from the Test Vehicles to form the Segments can be performed through a k-means cluster algorithm.

The controller 22 can initially include the Pre-established Predictive Activation Model(s) and the Pre-established Predictive Level Model(s) generated from each Segment but, as a default, utilize only the Pre-established Predictive Activation Model(s) and the Pre-established Predictive Level Model(s) for one particular Segment for the activation/deactivation of the heating element 18 (and level control). Data can then be collected relating to the Certain Identifiable Conditions while the user begins to operate the vehicle 10 for a certain period of time. This data can then be compared to the Segments to determine to which of the Segments the user of the vehicle 10 is most similar. For example, one of the Segments might be data from the subset of the Test Vehicles that were mainly driven on highways and the user might mainly drive the vehicle 10 on highways as well. The Pre-established Predictive Activation Model and the Pre-established Predictive Level Model derived from that particular Segment can then be the Pre-established Predictive Activation Model and the Pre-established Predictive Level Model utilized by the controller 22 thereafter.

The Pre-established Predictive Activation Model can be formed pursuant to a classification and regression tree ("CART") analysis of the data related to the Certain Identifiable Conditions collected from the Test Vehicles en masse or Segmented (resulting in Pre-established Predictive Activation Model(s) for each Segment), as explained above. There are a variety of CART analyses that can provide useful results, including the C.50 program (Release 2.07 GPL Edition, available from www.rulequest.com), the M5P classifier, as implemented in Weka (available from http://weka-.sourceforge.net/doc.stable/weka/classifiers/trees/M5P.html), and the Random Tree classifier, as implemented in Weka (available from http://weka.sourceforge.net/doc.dev/weka/classifiers/trees/RandomTree.html). There are other CART analyses available and this is not meant to be an exhaustive list.

An example Pre-established Predictive Activation Model formed pursuant to the C.50 program CART analysis is set forth below. This example Pre-established Predictive Activation Model sets forth the rules of the activation/deactivation of the heating element 18 to impart heating to the external surface 20 of the heating element 18 as a function of data relating to the Certain Identifiable Conditions.

```
InCarTemp <= 20.94798:
:...RCCM_Fr_Rr_Blower_Req <= 0.04545455:
:   :...coldInside20 <= 0:
:   :   :...InCarTempQF <= 2.763158: 0 (2)
:   :   :   InCarTempQF > 2.763158: 1 (33/7)
:   :   coldInside20 > 0:
:   :   :...InCarTemp <= 10: 0 (33/1)
:   :       InCarTemp > 10:
:   :       :...InCarTemp > 12.08333: 0 (68/16)
:   :           InCarTemp <= 12.08333:
:   :           :...Front_Rt_Temp_Setpt <= 142.95: 1 (11/2)
:   :               Front_Rt_Temp_Setpt > 142.95: 0 (3)
:   RCCM_Fr_Rr_Blower_Req > 0.04545455:
:   :...InCarTemp <= 19.7485: 1 (1934/28)
:       InCarTemp > 19.7485:
:       :...AirAmb_Te_Actl <= 4.716667:
:           :...Front_Rt_Temp_Setpt > 138.1818: 1 (300/2)
:           :   Front_Rt_Temp_Setpt <= 138.1818:
:           :   :...isMorning > 0: 0 (4)
:           :       isMorning <= 0:
:           :       :...RCCM_DF_Cond_Seat_Req <= 0: 1 (10/2)
:           :           RCCM_DF_Cond_Seat_Req > 0: 0 (2)
:           AirAmb_Te_Actl > 4.716667:
:           :...Front_Left_Temp_Setpt <= 140:
:               :...isMorning > 0: 0 (46/1)
:               :   isMorning <= 0:
:               :   :...InCarTemp <= 20.29802: 1 (15/5)
:               :       InCarTemp > 20.29802:
:               :       :...InCarTemp <= 20.93529: 0 (32/2)
:               :           InCarTemp > 20.93529: 1 (2)
:               Front_Left_Temp_Setpt > 140:
:               :...coldInside10 <= 0: 1 (99/18)
:                   coldInside10 > 0:
:                   :...AC_Request > 1.727273:
:                       :...Front_Rt_Temp_Setpt <= 138: 0 (2)
:                       :   Front_Rt_Temp_Setpt > 138: 1 (20/4)
:                       AC_Request <= 1.727273:
:                       :...InCarTemp > 20.11021: 0 (75/9)
:                           InCarTemp <= 20.11021:
:                           :...RCCM_Fr_Rr_Blower_Req <=
                                0.9581395: 0 (19/6)
:                               RCCM_Fr_Rr_Blower_Req > 0.9581395: 1 (8)
InCarTemp > 20.94798:
:...AirAmb_Te_Actl <= 1.487569:
    :...InCarTemp <= 23.36164:
    :   :...Front_Rt_Temp_Setpt <= 140.9863:
    :   :   :...AirAmb_Te_Actl <= -6.584821: 1 (76/1)
    :   :   :   AirAmb_Te_Actl > -6.584821:
    :   :   :   :...Veh_V_ActlEng_UB > 85.87412: 0 (41)
    :   :   :       Veh_V_ActlEng_UB <= 85.87412:
    :   :   :       :...Front_Left_Temp_Setpt > 140.9863: 0 (17)
    :   :   :           Front_Left_Temp_Setpt <= 140.9863:
    :   :   :           :...InCarTemp <= 22.23913: 1 (60/17)
    :   :   :               InCarTemp > 22.23913: 0 (50/9)
    :   :   Front_Rt_Temp_Setpt > 140.9863:
    :   :   :...InCarTemp <= 22.33793: 1 (273/4)
    :   :       InCarTemp > 22.33793:
    :   :       :...AirAmb_Te_Actl <= -1.482906: 1 (136/14)
    :   :           AirAmb_Te_Actl > -1.482906:
    :   :           :...InCarTemp > 22.92803:
    :   :               :...Front_Rt_Temp_Setpt <= 142.95: 0 (51/10)
    :   :               :   Front_Rt_Temp_Setpt > 142.95: 1 (3)
    :   :               InCarTemp <= 22.92803:
    :   :               :...isMorning <= 0: 1 (31/10)
    :   :                   isMorning > 0:
    :   :                   :...AirAmb_Te_Actl <= 0.2857143: 1 (3)
    :   :                       AirAmb_Te_Actl > 0.2857143: 0 (8)
    :   InCarTemp > 23.36164:
    :   :...AirAmb_Te_Actl <= -8.155629:
    :   :   :...InCarTemp > 25.19261:
    :   :   :   :...AirAmb_Te_Actl > -20.89634: 0 (90/5)
    :   :   :   :   AirAmb_Te_Actl <= -20.89634:
    :   :   :   :   :...InCarTemp <= 26.63714: 1 (4)
    :   :   :   :       InCarTemp > 26.63714: 0 (7/2)
    :   :   :   InCarTemp <= 25.19261:
    :   :   :   :...Front_Rt_Temp_Setpt > 140.9863: 1 (73/18)
    :   :   :       Front_Rt_Temp_Setpt <= 140.9863:
    :   :   :       :...RCCM_Fr_Rr_Blower_Req <= 0.6914893: 1 (3)
    :   :   :           RCCM_Fr_Rr_Blower_Req > 0.6914893:
    :   :   :           :...AirAmb_Te_Actl > -11.27286: 0 (33/1)
    :   :   :               AirAmb_Te_Actl <= -11.27286:
    :   :   :               :...InCarTemp <= 24.19364: 1 (6)
    :   :   :                   InCarTemp > 24.19364: 0 (10/1)
    :   :   AirAmb_Te_Actl > -8.155629:
```

-continued

```
:    :...InCarTemp > 24.11828: 0 (662/12)
:       InCarTemp <= 24.11828:
:       :...tempDiff <= 26.80822: 0 (153/15)
:          tempDiff > 26.80822:
:          :...Front__Left__Temp__Setpt <= 140.9863:
:          :...EngAout__N__Actl <= 856.9707: 1 (2)
:          :  EngAout__N__Actl > 856.9707:0 (19/1)
:          Front__Left__Temp__Setpt > 140.9863:
:          :...InCarTemp <= 23.54177: 1 (9)
:             InCarTemp > 23.54177:
:             :...coldInside30 <= 0: 1 (11/3)
:                coldInside30 > 0:
:                :...AC__Request <= 1.795455: 1 (13/5)
:                   AC__Request > 1.795455: 0 (21/5)
AirAmb__Te__Actl > 1.487569:
:...InCarTemp > 22.96875: 0 (3014/26)
   InCarTemp <= 22.96875:
   :...AirAmb__Te__Actl > 6.652516:
      :...Front__Left__Temp__Setpt > 143.1795:
      :  :...coldInside10 > 0: 0 (33/4)
      :  :  coldInside10 <= 0:
      :  :  :...RCCM__Fr__Rr__Blower__Req <= 0.9583333: 1 (9/2)
      :  :     RCCM__Fr__Rr__Blower__Req > 0.9583333: 0 (4)
      :  Front__Left__Temp__Setpt <= 143.1795:
      :  :...AirAmb__Te__Actl > 9.283654: 0 (719/16)
      :     AirAmb__Te__Actl <= 9.283654:
      :     :...InCarTemp > 21.20414: 0 (247/19)
      :        InCarTemp <= 21.20414:
      :        :...Front__Rt__Temp__Setpt <= 140.9863: 0 (5)
      :           Front__Rt__Temp__Setpt > 140.9863:
      :           :...Overriding__ModeReq <= 1.898305: 0 (4)
      :              Overriding__ModeReq > 1.898305: 1 (13/2)
      AirAmb__Te__Actl <= 6.652516:
      :...InCarTemp > 21.99206:
         :...Front__Rt__Temp__Setpt <= 140.9863: 0 (50)
         :  Front__Rt__Temp__Setpt > 140.9863:
         :  :...AirAmb__Te__Actl > 5.568714: 0 (52)
         :     AirAmb__Te__Actl <= 5.568714:
         :     :...isMorning <= 0:
         :        :...InCarTemp <= 22.41667: 1 (30/12)
         :        :  InCarTemp > 22.41667: 0 (56/13)
         :        isMorning > 0:
         :        :...Veh__V__ActlEng__UB <= 106.6641: 0 (42/4)
         :           Veh__V__ActlEng__UB > 106.6641: 1 (10/3)
         InCarTemp <= 21.99206:
         :...Front__Rt__Temp__Setpt > 140.1316:
            :...Overriding__ModeReq <= 1.428571: 0 (8)
            :  Overriding__ModeReq > 1.428571: 1 (82/14)
            Front__Rt__Temp__Setpt <= 140.1316:
            :...Veh__V__ActlEng <= 0.4081633: 1 (4)
               Veh__V__ActlEng > 0.4081633:
               :...isMorning > 0: 0 (20)
                  isMorning <= 0:
                  :...RCCM__Fr__Rr__Blower__Req <= 0.9537572: 0 (8)
                     RCCM__Fr__Rr__Blower__Req > 0.9537572:
                     :...AirAmb__Te__Actl <= 5.457317: 1 (5)
                        AirAmb__Te__Actl > 5.457317: 0 (2)
```

Those skilled in the art will understand how to decipher the above Pre-Established Predictive Activation Model. Each line includes an identifier related to a specific Certain Identifiable Condition. For example, the first line "InCarTemp<=20.94798:" includes the identifier "InCarTemp," which as set forth above means the temperature of the interior 12 of the vehicle 10. Each line includes a value related to the preceding Certain Identifiable Condition. For example, the first line "InCarTemp<=20.94798:" includes the value "20.94798," which means 20.94798 degrees Celsius. Each line includes a conditional statement. For example, the first line "InCarTemp<=20.94798:" can be read to mean "if the temperature of the interior 12 of the vehicle 10 is less than or equal to 20.94798 degrees Celsius and . . . " The reading would then proceed to the second line, which is indented and otherwise identified as subservient to the first line. The second line "RCCM_Fr_Rr_Blower_Req<=0.04545455:" can be read to mean "if the level at which the climate control system in the vehicle 10 is blowing air is less than or equal to a certain level (which in this case is represented by the value "0.4545455") and . . . " The reading would then proceed to the third line, which is subservient to the second line. The third line "coldInside20<=0" can be read to mean "if the ambient temperature is above 60 degrees Fahrenheit or if the temperature differential between temperature of the interior 12 of the vehicle 10 and the ambient temperature is greater than 20 degrees Fahrenheit and . . . " The reading would then proceed to the fourth and fifth lines, which are subservient to the third line. The fourth line states "InCarTempQF<=2.763158:0" while the fifth line states "InCarTempQF>2.763158: 1." The fourth and fifth lines include an identifier, a value as before, and further includes a conclusion denoted by "0" or "1" following a colon ":". The "0" of the fourth line signifies deactivation/non-activation of the heating element 18 to impart heating. In contrast, the fifth line includes ":1" signifying activation of the heating element 18 to impart heating. Thus, the fourth line is read to mean "if the temperature of the interior 12 of the vehicle 10 is less than or equal to 2.736158 degrees Celsius, then the heating element 18 is not activated/deactivated." The fifth line in contrast is read to mean "if the temperature of the interior 12 of the vehicle is greater than 2.736158 degrees Celsius, then the heating element 18 is activated.

Therefore, the first through fifth lines together

```
InCarTemp <= 20.94798:
:...RCCM__Fr__Rr__Blower__Req <= 0.04545455:
   :  :...coldInside20 <= 0:
   :  :  :...InCarTempQF <= 2.763158: 0 (2)
   :  :  :  InCarTempQF > 2.763158: 1 (33/7)
``` can be read as: If the temperature of the interior 12 of the vehicle 10 is less than or equal to 20.94798 degrees Celsius, and if the level at which the climate control system in the vehicle 10 is blowing air is less than or equal to a certain level, and if the ambient temperature is above 60 degrees Fahrenheit or if the temperature differential between the temperature of the interior 12 of the vehicle 10 and the ambient temperature is greater than 20 degrees Fahrenheit, and if the temperature of the interior 12 of the vehicle 10 is less than or equal to 2.736158 degrees Celsius, then the heating element 18 is not activated/deactivated, but if the temperature of the interior 12 of the vehicle 10 is greater than 2.736158 degrees Celsius, then the heating element 18 is activated.

The above example is a relatively simple Pre-Established Predictive Activation Model for heating, because the Pre-Established Predictive Activation Model established rules that are a function of only several of the Certain Identifiable Conditions, namely the temperature of the interior 12 of the vehicle 10 ("InCarTemp" and "InCarTempQF"), the level at which the climate control system in the vehicle 10 is blowing air ("RCCM_Fr_Rr_Blower_Req"), and whether the ambient temperature is above 60 degrees Fahrenheit or the temperature differential between the temperature of the interior 12 of the vehicle 10 and the ambient temperature is greater than 20 degrees Fahrenheit ("coldInside20<=0").

More specifically, referring now to FIGS. 5A-5G, at step 56, the controller 22 begins the process of comparing the collected data to the Pre-established Predictive Activation Model (step 50 in the overall process illustrated in FIG. 4). After step 56, the controller 22 proceeds to step 58, where the controller 22 determines whether the temperature of the interior 12 of the vehicle 10 ("InCarTemp") is greater than 20.94798 degrees Celsius, or less than or equal to 20.94798 degrees Celsius. If the controller 22 determines that the temperature of the interior 12 of the vehicle 10 is less than or equal to 20.94798 degrees Celsius ("InCarTemp<=20.94798"), then the controller 22 proceeds to step 60. At step 60, the controller 22 determines whether the level at which the climate control system in the vehicle 10 is blowing air ("RCCM_Fr_Rr_Blower_Req") is greater than, or less than or equal to a certain value. If the controller 22 determines that the level at which the climate control system in the vehicle 10 is blowing air ("RCCM_Fr_Rr_Blower_Req") is less than or equal to a certain value ("RCCM_Fr_Rr_Blower_Req<=0.04545455"), then the controller 22 proceeds to step 62. At step 62, the controller 22 determines whether the defined condition "ColdInside20" described above is true (">0") or false ("<=0"). If the controller 22 determines that the defined condition "coldInside20" is false ("coldInside20<=0") signifying that the temperature is either above 60 degrees Fahrenheit or the temperature differential ("tempDiff" explained above) is greater than 20 degrees Fahrenheit, then the controller 22 proceeds to step 64. At step 64, the controller 22 determines whether the temperature of the interior 12 of the vehicle 10 ("InCarTempQF") is greater than, or less than or equal to, a certain value (2.763158 degrees Celsius). If at step 64, the controller 22 determines that the temperature of the interior 12 of the vehicle 10 is less than or equal to the certain value ("InCarTempQF<=2.763158"), then the controller 22 proceeds to step 66 and does not activate the heating element 18 or deactivates the heating element 18 if previously already automatically activated by the controller 22. However, if at step 64, the controller 22 determines that the temperature of the interior 12 of the vehicle 10 is greater than the certain value ("InCarTempQF>2.763158"), then the controller 22 proceeds to step 68 and activates the heating element 18. As illustrated then, when the temperature of the interior of the vehicle is below a certain temperature, the controller automatically activates the heating element 18 pursuant to the rules of the Pre-established Activation Model as a function of data relating to at least one other of the Certain Identifiable Conditions excluding the temperature of the interior of the vehicle.

Referring back to at step 62, if the controller 22 determines that the defined condition "ColdInside20" is true ("coldInside20>0") signifying that the temperature is both below 60 degrees Fahrenheit and the temperature differential ("tempDiff" explained above) is less than 20 degrees Fahrenheit, then the controller 22 proceeds to step 70. At step 70, the controller 22 determines whether the temperature of the interior 12 of the vehicle 10 ("InCarTemp") is less than or equal to a certain temperature ("10" degree Celsius), or greater than the certain temperature. If the controller 22 determines that the temperature of the interior 12 of the vehicle 10 is less than or equal to the certain value ("InCarTemp<=10"), then the controller 22 proceeds to step 72 and does not activate the heating element 18 or deactivates the heating element 18 if previously already automatically activated by the controller 22. However, at step 70, if the controller 22 determines that the temperature of the interior 12 of the vehicle 10 is greater than the certain value ("InCarTemp>10"), then the controller 22 proceeds to step 74. At step 74, the controller 22 determines whether the temperature of the interior 12 of the vehicle 10 ("InCarTemp") is less than or equal to a certain temperature ("12.08333" degree Celsius), or greater than the certain temperature. If the controller 22 determines that the temperature of the interior 12 of the vehicle 10 is greater than the certain value ("InCarTemp>12.08333"), then the controller 22 proceeds to step 76 and does not activate the heating element 18 or deactivates the heating element 18 if previously already automatically activated by the controller 22. However, at step 74, if the controller 22 determines that the temperature of the interior 12 of the vehicle 10 is less than or equal to the certain value ("InCarTemp<=12.08333"), then the controller 22 proceeds to step 78. At step 78, the controller 22 determines whether the front passenger side temperature set point ("Front_Rt_Temp_Setpt") is less than or equal to, or greater than a certain value ("142.95"). If the controller 22 determines that the front passenger side temperature set point is less than or equal to the certain value ("Front_Rt_Temp_Setpt<=142.95"), then the controller 22 proceeds to step 80 and activates the heating element 18. However, if the controller 22 determines that the front passenger side temperature set point is greater than the certain value ("Front_Rt_Temp_Setpt>142.95"), then the controller 22 proceeds to step 82 and does not activate the heating element 18 or deactivates the heating element 18 if previously already automatically activated by the controller 22. Accordingly, from the above, when the temperature in the interior 12 of the vehicle 10 is below a certain value, the controller 22 applying the rules of the Pre-established Activation Predictive Model will activate or deactivate/not activate the heating element 18 as a function of other Certain Identifiable Conditions such as the front passenger side temperature set point, such that when the passenger side temperature set point is greater than a certain value, the controller automatically activates the heating element 18, but when the passenger side temperature set point is less than a certain value, the controller 22 does not automatically activate the heating element 18.

Referring back to step 60, if the controller 22 determines that the level at which the climate control system in the vehicle 10 is blowing air is greater than the certain value ("RCCM_Fr_Rr_Blower_Req>0.04545455"), then the controller 22 proceeds to step 84. At step 84, the controller 22 determines whether the temperature of the interior 12 of the vehicle 10 ("InCarTemp") is less than or equal to, or greater than a certain value ("19.7485"). If the controller 22 determines that the temperature of the interior 12 of the vehicle 10 is less than or equal to the certain value ("InCarTemp<=19.7485"), then the controller 22 proceeds to step 86 and activates the heating element 18. However, if the controller 22 determines that the temperature of the interior 12 of the vehicle 10 is greater than the certain value ("InCarTemp>19.7485"), then the controller 22 proceeds to step 88. At step 88, the controller 22 determines whether the ambient temperature ("AirAmb_Te_Actl") is less than or equal to, or greater than, a certain value ("4.716667"). If the controller 22 determines that the ambient temperature is less than or equal to the certain value ("AirAmb_Te_Actl<=4.716667"), then the controller 22 proceeds to step 90. At step 90, the controller 22 determines whether the front passenger side temperature set point ("Front_Rt_Temp_Setpt") is greater than, or less than or equal to, a certain value. If the controller 22 determines that the front passenger side temperature set point is greater than the certain value ("Front_Rt_Temp_Setpt>138.1818"), then the controller 22 activates the heating element 18 at step 92. However, if the controller 22 determines that the front passenger side temperature set point is less than or equal to the certain value ("Front_Rt_Temp_Setpt<=138.1818"), then the controller 22 proceeds to step 94. At step 94, the controller 22 determines whether the time of day is a morning hour ("isMorning"). If the controller 22 determines that the time of day is a morning hour ("isMorning>0" meaning "TRUE"), then the controller 22 proceeds to step 96 and does not activate the heating element 18 or deactivates the heating element 18 if previously already automatically activated by the controller 22. However, if the controller 22 determines that the time of day is not a morning hour ("isMorning<=0"), then the controller 22 proceeds to step 98. At step 98, the controller 22 determines whether the user has activated heating of the seating assembly 16 ("RCCM_DF_Cond_Seat_Req"). If the controller 22 determines that the user has not activated heating of the seating assembly 16 ("RCCM_DF_Cond_Seat_Req<=0" meaning "FALSE"), then the controller 22 proceeds to step 100 and activates the heating element 18. However, if the controller 22 determines that the user has activated heating of the seating assembly 16 ("RCCM_DF_Cond_Seat_Req>0"), then the controller 22 proceeds to step 102 and does not activate the heating element 18 or deactivates the heating element 18 if previously already automatically activated by the controller 22. Therefore, according to the above rules of the Pre-established Predictive Activation Model, assuming other Certain Identifiable Conditions are present, the controller 22 activates the heating element 18 if heating of the seating assembly 16 has not been activated, but the controller 22 does not activate the heating element 18 if heating of the seating assembly 16 has been activated.

Referring back to step 88, if the controller 22 determines that the ambient temperature is above the certain value ("AirAmb_Te_Actl>4.716667"), then the controller 22 proceeds to step 104. At step 104, the controller 22 determines whether the front user/operator side temperature set point ("Front_Left_Temp_Setpt") is less than or equal to, or greater than, a certain value ("140"). If the controller 22 determines that the front user/operator side temperature set point is less than or equal to the certain value ("Front_Left_Temp_Setpt<=140"), then the controller 22 proceeds to step 106. At step 106, the controller 22 determines whether the time of day is a morning hour ("isMorning"). If the controller 22 determines that the time of day is a morning hour ("isMorning>0" meaning "TRUE"), then the controller 22 proceeds to step 108 and does not activate the heating element 18 or deactivates the heating element 18 if previously already automatically activated by the controller 22. If the controller 22 determines that the time of day is not a morning hour ("isMorning<=0"), then the controller 22 proceeds to step 110. At step 110, the controller 22 determines whether the temperature of the interior 12 of the vehicle 10 ("InCarTemp") is less than or equal to, or greater than, a certain value ("20.29802"). If the controller 22 determines that the temperature of the interior 12 of the vehicle 10 is less than or equal to the certain value ("InCarTemp<=20.29802"), then the controller 22 proceeds to step 112 and activates the heating element 18. If the controller 22 determines that the temperature of the interior 12 of the vehicle 10 is greater than the certain value ("InCarTemp>20.29802"), than the controller 22 proceeds to step 114. At step 114, the controller 22 determines whether the temperature of the interior 12 of the vehicle 10 ("InCarTemp") is less than or equal to, or greater than, a certain value ("20.93529"). If the controller 22 determines that the temperature of the interior 12 of the vehicle 10 is less than or equal to the certain value ("InCarTemp<=20.93529"), then the controller 22 proceeds to step 116 and does not activate the heating element 18 or deactivates the heating element 18 if previously already automatically activated by the controller 22. However, if the controller 22 determines that the temperature of the interior 12 of the vehicle 10 is greater than the certain value ("InCarTemp>20.93529"), then the controller 22 proceeds to step 118 and activates the heating element 18.

Referring back to step 104, if the controller 22 determines that the front user/operator side temperature set point is greater than the certain value ("Front_Left_Temp_Setpt>140"), then the controller 22 proceeds to step 120. At step 120, the controller 22 determines whether the condition "coldInside10" described above is TRUE or FALSE. If the controller 22 determines that the condition "coldInside10" is FALSE ("coldInside10<=0"), then the controller 22 proceeds to step 122 and activates the heating element 18. However, if the controller 22 determines that the condition "coldInside10" is TRUE ("coldInside10>0"), then the controller 22 proceeds to step 124. At step 124, the controller 22 determines whether air conditioning in the vehicle 10 has been activated ("AC_Request"). If the controller 22 determines that the air conditioning in the vehicle 10 has been activated ("AC_Request>1.727273, meaning "TRUE"), then the controller 22 proceeds to step 126. At step 126, the controller 22 determines whether the front passenger side temperature set point ("Front_Rt_Temp_Setpt") is greater than, or less than or equal to, a certain value ("138"). If the controller 22 determines that the front passenger side temperature set point is less than or equal to the certain value ("Front_Rt_Temp_Setpt<=138"), then the controller 22 proceeds to step 128 and does not activate the heating element 18 or deactivates the heating element 18 if previously already automatically activated by the controller 22. However, if the controller 22 determines that the front passenger side temperature set point is greater than the certain value ("Front_Rt_Temp_Setpt>138"), then the controller 22 proceeds to step 130 and activates the heating element 18.

Referring back to step 124, if the controller 22 determines that the air conditioning in the vehicle 10 has not been activated ("AC_Request<=1.727273," meaning "FALSE"), then the controller 22 proceeds to step 132. At step 132, the controller 22 determines whether the temperature in the interior 12 of the vehicle 10 ("InCarTemp") is greater than, or less than or equal to, a certain value ("20.11021"). If the controller 22 determines that the temperature in the interior 12 in the vehicle 10 is greater than the certain value ("InCarTemp>20.11021"), then the controller 22 proceeds to step 134 and does not activate the heating element 18 or deactivates the heating element 18 if previously already automatically activated by the controller 22. However, if the controller 22 determines that the temperature in the interior 12 of the vehicle 10 is less than or equal to the certain value ("InCarTemp<=20.11021"), then the controller 22 proceeds to step 136. At step 136, the controller 22 determines the level at which the climate control system in the vehicle 10 is blowing air ("RCCM_Fr_Rr_Blower_Req"). If the controller 22 determines that the level at which the climate control system in the vehicle 10 is blowing air is less than or equal to a certain level ("RCCM_Fr_Rr_Blower_Req<=0.9581395"), then the controller 22 proceeds to step 138 and does not activate the heating element 18 or deactivates the heating element 18 if previously already automatically activated by the controller 22. However, if the controller 22 determines that the level at which the climate control system in the vehicle 10 is blowing air is greater than the certain level ("RCCM_Fr_Rr_Blower_Req>0.9581395"), then the controller 22 proceeds to step 140 and activates the heating element 18. Accordingly, there can be instances, according to the rules of the Pre-established Predictive Activation Model, when the controller 22 (a) activates the heating element 18 if the level at which the climate control system in the vehicle 10 is blowing air is greater than a certain level, but (b) does not activate the heating element 18 or deactivates the heating element 18 if the level at which the climate control system in the vehicle 10 is blowing air is less than the certain level.

Referring back to step 58, if the controller 22 determines that the temperature in the interior 12 of the vehicle 10 is greater than the certain value ("InCarTemp>20.94798"), then the controller 22 proceeds to step 142. At step 142, the controller 22 determines whether the ambient temperature ("AirAmb_Te_Actl") is less than or equal to, or greater than, a certain value ("1.487569"). If the controller 22 determines that the ambient temperature is less than or equal to the certain value ("AirAmb_Te_Actl<=1.487569"), then the controller proceeds to step 144. At step 144, the controller 22 determines whether the temperature in the interior 12 of the vehicle 10 ("InCarTemp") is less than or equal to, or greater than a certain value ("23.36164"). If the controller 22 determines that the temperature in the interior 12 of the vehicle 10 is less than or equal to the certain value ("InCarTemp<=23.36164"), then the controller 22 proceeds to step 146. At step 146, the controller 22 determines whether the front passenger side temperature set point ("Front_Rt_Temp_Setpt") is greater than, or less than or equal to, a certain value ("140.9863"). If the controller 22 determines that the front passenger side temperature set point is less than or equal to the certain value ("Front_Rt_Temp_Setpt<=140.9863"), then the controller 22 proceeds to step 148. At step 148, the controller 22 determines whether the ambient temperature ("AirAmb_Te_Actl") is less than or equal to, or greater than, a certain value ("−6.584821"). If the controller 22 determines that the ambient temperature is less than or equal to the certain value ("AirAmb_Te_Actl<=−6.584821"), then the controller 22 proceeds to step 150 and activates the heating element 18. If the controller 22 determines that the ambient temperature is greater than the certain temperature ("AirAmb_Te_Actl>−6.584821"), then the controller 22 proceeds to step 152. At step 152, the controller 22 determines whether the vehicle 10 speed ("Veh_V_ActlEng_UB") is greater than, or less than or equal to, a certain value. If the controller 22 determines that the vehicle 10 speed is greater than a certain value ("Veh_V_ActlEng_UB>85.87412" which can be in miles per hour), then the controller proceeds to step 154 and does not activate the heating element 18 or deactivates the heating element 18 if previously already automatically activated by the controller 22. However, if the controller 22 determines that the vehicle 10 speed is less than or equal to the certain value ("Veh_V_ActlEng_UB<=85.87412"), then the controller 22 proceeds to step 156. At step 156, the controller 22 determines whether the front user/operator side temperature set point ("Front_Left_Temp_Setpt") is less than or equal, or greater than, a certain value ("140.9863"). If the controller 22 determines that the front user/operator side temperature set point is greater than a certain value ("Front_Left_Temp_Setpt>140.9863"), then the controller 22 proceeds to step 158 and does not activate the heating element 18 or deactivates the heating element 18 if previously already automatically activated by the controller 22. However, if the controller 22 determines that the front user/operator side temperature set point is less than or equal to the certain value ("Front_Left_Temp_Setpt<=140.9863"), then the controller 22 proceeds to step 160. At step 160, the controller 22 determines whether the temperature in the interior 12 of the vehicle 10 ("InCarTemp") is less than or equal to, or greater than, a certain value ("22.23913"). If the controller 22 determines that the temperature in the interior 12 is less than or equal to the certain value ("InCarTemp<=22.23913"), then the controller 22 proceeds to step 162 and activates the heating element 18. However, if the controller 22 determines that the temperature in the interior 12 is greater than the certain value ("InCarTemp>22.23913"), then the controller 22 proceeds to step 164 and does not activate the heating element 18 or deactivates the heating element 18 if previously already automatically activated by the controller 22. Accordingly, there can be circumstances where the determination to activate or not activate/deactivate the heating element 18 can be a function of the speed of the vehicle 10.

Referring back to step 146, if the controller 22 determines that the front passenger side temperature set point is greater than the certain value ("Front_Rt_Temp_Setpt>140.9863"), then the controller 22 proceeds to step 166. At step 166, the controller 22 determines whether the temperature of the interior 12 ("InCarTemp") is less than or equal to, or greater than, a certain value ("22.33793"). If the controller 22 determines that the temperature of the interior 12 is less than or equal to the certain value ("InCarTemp<=22.33793"), then the controller 22 proceeds to step 168 and activates the heating element 18. However, if the controller 22 determines that the temperature of the interior 12 is greater than the certain value ("InCarTemp>22.33793"), then the controller proceeds to step 170. At step 170, the controller 22 determines whether the ambient temperature ("AirAmb_Te_Actl") is less than or equal to, or greater than, a certain value ("−1.482906"). If the controller 22 determines that the ambient temperature is less than or equal to the certain temperature ("AirAmb_Te_Actl<=−1.482906"), then the controller 22 proceeds to step 172 and activates the heating element 18. However, if the controller 22 determines that the ambient temperature is greater than the certain value ("AirAmb_Te_Actl>−1.482906"), then the controller 22 proceeds to step 174. At step 174, the controller 22 determines whether the temperature of the interior 12 ("InCarTemp") is greater than or less than a certain value ("22.92803"). If the controller 22 determines that the temperature of the interior 12 is greater than the certain value ("InCarTemp>22.92803"), then the controller 22 proceeds to step 176. At step 176, the controller 22 determines whether the front passenger side temperature set point ("Front_Rt_Temp_Setpt") is less than or equal to, or greater than, a certain value ("142.95"). If the controller 22 determines that the front passenger side temperature set point is less than or equal to the certain value ("Front_Rt_Temp_Setpt<=142.95"), then the controller 22 proceeds to step 178 and does not activate the heating element 18 or deactivates the heating element 18 if previously already automatically activated by the controller 22. However, if the controller 22 determines that the front passenger side temperature set point is greater than the certain value ("Front_Rt_Temp_Setpt>142.95"), then the controller 22 proceeds to step 180 and activates the heating element 18.

Referring back to step 174, if the controller 22 determines that the temperature of the interior 12 is less than or equal to the certain value ("InCarTemp<=22.92803"), then the controller proceeds to step 182. At step 182, the controller 22 determines whether the time of day is a morning hour ("isMorning"). If the controller 22 determines that the time of day is not a morning hour ("isMorning<=0" meaning "FALSE"), then the controller proceeds to step 184 and activates the heating element 18. However, if the controller 22 determines that the time of day is a morning hour ("isMorning>0" meaning "TRUE"), then the controller 22 proceeds to step 186. At step 186, the controller 22 determines whether the ambient temperature ("AirAmb_Te_Actl") is less than or equal to, or greater than, a certain value ("0.2857143"). If the controller 22 determines that the ambient temperature is less than or equal to the certain value ("AirAmb_Te_Actl<=0.2857143"), then the controller proceeds to step 188 and activates the heating element 18. However, if the controller 22 determines that the ambient temperature is greater than the certain temperature ("AirAmb_Te_Actl>0.2857143"), then the controller 22 proceeds to step 190 and does not activate the heating element 18 or deactivates the heating element 18 if previously already automatically activated by the controller 22.

Referring back to step 144, if the controller 22 determines that the interior 12 temperature is greater than the certain temperature ("InCarTemp>23.36164"), then the controller 22 proceeds to step 192. At step 192, the controller 22 determines whether the ambient temperature ("AirAmb_Te_Actl") is less than or equal to, or greater than, a certain value ("−8.155629"). If the controller 22 determines that the ambient temperature is less than or equal to the certain value ("AirAmb_Te_Actl<=−8.155629"), then the controller 22 proceeds to step 194. At step 194, the controller 22 determines whether the temperature of the interior 12 ("InCarTemp") is greater than, or less than or equal to, a certain value ("25.19261"). If the controller 22 determines that the temperature of the interior 12 is greater than the certain value ("InCarTemp>25.19261"), then the controller 22 proceeds to step 196. At step 196, the controller 22 determines whether the ambient temperature ("AirAmb_Te_Actl") is greater than, or less than or equal to, a certain value ("−20.89634"). If the controller 22 determines that the ambient temperature is greater than the certain temperature ("AirAmb_Te_Actl>−20.89634"), then the controller 22 proceeds to step 198 and does not activate the heating element 18 or deactivates the heating element 18 if previously already automatically activated by the controller 22. However, if the controller 22 determines that the ambient temperature is less than or equal to the certain value ("AirAmb_Te_Actl<=−20.89634"), then the controller 22 proceeds to step 200. At step 200, the controller 22 determines whether the temperature of the interior 12 ("InCarTemp") is less than or equal to, or greater than, a certain value ("26.63714"). If the controller 22 determines that the temperature of the interior 12 is less than or equal to the certain value ("InCarTemp<=26.63714"), then the controller proceeds to step 202 and activates the heating element 18. However, if the controller 22 determines that the temperature of the interior 12 is greater than the certain value ("InCarTemp>26.63714"), then the controller proceeds to step 204 and does not activate the heating element 18 or deactivates the heating element 18 if previously already automatically activated by the controller 22.

Returning to step 194, if the controller 22 determines that the temperature of the interior 12 is less than or equal to the certain value ("InCarTemp<=25.19261"), then the controller 22 proceeds to step 206. At step 206, the controller 22 determines whether the front passenger side temperature set point ("Front_Rt_Temp_Setpt") is less than or equal to, or greater than, a certain value ("140.9863"). If the controller 22 determines that the front passenger side temperature set point is greater than the certain value ("Front_Rt_Temp_Setpt>140.9863"), then the controller proceeds to step 208 and activates the heating element 18. However, if the controller 22 determines that the front passenger side temperature set point is less than or equal to the certain value ("Front_Rt_Temp_Setpt<=140.9863"), then the controller 22 proceeds to step 210. At step 210, the controller 22 determines the level at which the climate control system in the vehicle 10 is blowing air ("RCCM_Fr_Rr_Blower_Req"). If the controller 22 determines that the climate control system in the vehicle 10 is blowing air at a level less than or equal to a certain value ("RCCM_Fr_Rr_Blower_Req<=0.6914893"), then the controller 22 proceeds to step 212 and activates the heating element 18. However, if the controller 22 determines that the climate control system in the vehicle 10 is blowing air at a level greater than the certain value ("RCCM_Fr_Rr_Blower_Req>0.6914893"), then the controller 22 proceeds to step 214. At step 214, the controller 22 determines whether the ambient temperature ("AirAmb_Te_Actl") is greater than, or less than or equal to, a certain value ("−11.27286"). If the controller 22 determines that the ambient temperature is greater than the certain value ("AirAmb_Te_Actl>−11.27286"), then the controller 22 proceeds to step 216 and does not activate the heating element 18 or deactivates the heating element 18 if previously already automatically activated by the controller 22. However, if the controller 22 determines that the ambient temperature is less than or equal to the certain temperature ("AirAmb_Te_Actl<=−11.27286"), then the controller 22 proceeds to step 218. At step 218, the controller 22 determines whether the temperature of the interior 12 ("InCarTemp") is less than or equal to, or greater than, a certain value ("24.19364"). If the controller 22 determines that the temperature of the interior 12 is less than or equal to the certain value ("InCarTemp<=24.19364"), then the controller proceeds to step 220 and activates the heating element 18. However, if the controller 22 determines that the temperature of the interior 12 is greater than the certain value ("InCarTemp>24.19364"), then the controller 22 proceeds to step 222 and does not activate the heating element 18 or deactivates the heating element 18 if previously already automatically activated by the controller 22.

Referring back to step 192, if the controller 22 determines that the ambient temperature is greater than the certain value ("AirAmb_Te_Actl>−8.155629"), then the controller 22 proceeds to step 224. At step 224, the controller 22 determines whether the temperature of the interior 12 ("InCarTemp") is greater than, or less than or equal to, a certain value ("24.11828"). If the controller 22 determines that the temperature of the interior 12 is greater than the certain value ("InCarTemp>24.11828"), then the controller 22 proceeds to step 226 and does not activate the heating element 18 or deactivates the heating element 18 if previously already automatically activated by the controller 22. However, if the controller 22 determines that the temperature of the interior 12 is less than or equal to the certain value ("InCarTemp<=24.11828"), then the controller 22 proceeds to step 228. At step 228, the controller 22 determines whether the temperature differential between the ambient temperature and the temperature of the interior 12 ("tempDiff") is less than or equal to, or greater than, a certain value ("26.80822"). If the controller 22 determines that the temperature differential is less than or equal to the certain value ("tempDiff<=26.80822"), then the controller 22 proceeds to step 230 and does not activate the heating element 18 or deactivates the heating element 18 if previously already automatically activated by the controller 22. However, if the controller 22 determines that the temperature differential is greater than the certain value ("tempDiff>26.80822"), then the controller 22 proceeds to step 232. At step 232, the controller 22 determines whether the front user/operator side temperature set point ("Front_Left_Temp_Setpt") is less than or equal, or greater than, a certain value ("140.9863"). If the controller 22 determines that the front user/operator side temperature set point is less than or equal to the certain value ("Front_Left_Temp_Setpt<=140.9863"), then the controller 22 proceeds to step 234. At step 234, the controller 22 determines whether the engine speed ("EngAout_N_Actl") is less than or equal to, or greater than, a certain value ("856.9707"). If the controller 22 determines that the engine speed is less than or equal to the certain value ("EngAout_N_Actl<=856.9707"), then the controller 22 proceeds to step 236 and activates the heating element 18. However, if the controller 22 determines that the engine speed is greater than the certain value ("EngAout_N_Actl>856.9707"), then the controller 22 proceeds to step 238 and does not activate the heating element 18 or deactivates the heating element 18 if previously already automatically activated by the controller 22.

Referring back to step 232, if the controller 22 determines that the front user/operator side temperature set point is greater than the certain value ("Front_Left_Temp_Setpt>140.9863"), then the controller 22 proceeds to step 240. At step 240, the controller 22 determines whether the temperature of the interior 12 ("InCarTemp") is less than or equal to, or greater than, a certain value ("InCarTemp<=23.54177"). If the controller 22 determines that the temperature of the interior 12 is less than or equal to the certain value ("InCarTemp<=23.54177"), then the controller 22 proceeds to step 242 and activates the heating element 18. If the controller 22 determines that the temperature of the interior 12 is greater than the certain value ("InCarTemp>23.54177"), then the controller 22 proceeds to step 244. At step 244, the controller 22 determines whether the defined condition "coldInside30" is satisfied. If the controller 22 determines that the defined condition is not satisfied ("coldInside30<=0" meaning "FALSE"), then the controller 22 proceeds to step 246 and activates the heating element 18. However, if the controller 22 determines that the defined condition is satisfied ("coldInside30>0" meaning "TRUE"), then the controller 22 proceeds to step 248. At step 248, the controller 22 determines whether air conditioning in the vehicle 10 has been activated ("AC_Request"). If the controller 22 determines that the air conditioning in the vehicle 10 has not been activated ("AC_Request<=1.795455" meaning "FALSE"), then the controller 22 proceeds to step 250 and activates the heating element 18. However, if the controller 22 determines that the air conditioning in the vehicle 10 has been activated ("AC_Request>1.795455"), then the controller 22 proceeds to step 252 and does not activate the heating element 18 or deactivates the heating element 18 if previously already automatically activated by the controller 22.

Referring back to step 142, if the controller 22 determines that the ambient temperature is greater than the certain value ("AirAmb_Te_Actl>1.487569"), then the controller 22 proceeds to step 254. At step 254, the controller 22 determines whether the temperature of the interior 12 ("InCarTemp") is greater than, or less than or equal to, a certain value ("22.96875"). If the controller 22 determines that the temperature of the interior 12 is greater than the certain value ("InCarTemp>22.96875"), then the controller 22 proceeds to step 256 and does not activate the heating element 18 or deactivates the heating element 18 if previously already automatically activated by the controller 22. However, if the controller 22 determines that the temperature of the interior 12 is less than or equal to the certain value ("InCarTemp<=22.96875"), then the controller 22 proceeds to step 258. At step 258, the controller 22 determines whether the ambient temperature ("AirAmb_Te_Actl") is greater than, or less than or equal to, a certain value ("6.652516"). If the controller 22 determines that the ambient temperature is greater than the certain value ("AirAmb_Te_Actl>6.652516"), then the controller proceeds to step 260. At step 260, the controller 22 determines whether the front user/operator side temperature set point ("Front_Left_Temp_Setpt") is greater than, or less than or equal to, a certain value ("143.1795"). If the controller 22 determines that the front user/operator side temperature set point is greater than the certain value ("Front_Left_Temp_Setpt>143.1795"), then the controller 22 proceeds to step 262. At step 262, the controller 22 determines whether the defined condition "coldInside10" is satisfied. If the controller 22 determines that the defined condition is satisfied ("coldInside10>0" meaning "TRUE"), then the controller proceeds to step 264 and does not activate the heating element 18 or deactivates the heating element 18 if previously already automatically activated by the controller 22. However, if the controller 22 determines that the defined condition is not satisfied ("coldInside10<=0"), then the controller proceeds to step 266. At step 266, the controller 22 determines whether the level at which the climate control system in the vehicle 10 is blowing air ("RCCM_Fr_Rr_Blower_Req"). If the controller 22 determines that the climate control system in the vehicle 10 is blowing air is less than or equal to a certain level ("RCCM_Fr_Rr_Blower_Req<=0.9583333"), then the controller 22 proceeds to step 268 and activates the heating element 18. However, if the controller 22 determines that the climate control system in the vehicle 10 is blowing air is greater than the certain level ("RCCM_Fr_Rr_Blower_Req>0.9583333"), then the controller 22 proceeds to step 270 and does not activate the heating element 18 or deactivates the heating element 18 if previously already automatically activated by the controller 22.

Referring back to step 260, if the controller 22 determines that the front user/operator side temperature set point is less than or equal to the certain value ("Front_Left_Temp_Setpt<=143.1795"), then the controller 22 proceeds to step 272. At step 272, the controller determines whether the ambient temperature ("AirAmb_Te_Actl") is greater than, or less than or equal to, a certain value ("9.283654"). If the controller 22 determines that the ambient temperature is greater than the certain value ("AirAmb_Te_Actl>9.283654"), then the controller 22 proceeds to step 274 and does not activate the heating element 18 or deactivates the heating element 18 if previously already automatically activated by the controller 22. However, if the controller 22 determines that the ambient temperature is less than or equal to the certain value ("AirAmb_Te_Actl<=9.283654"), then the controller 22 proceeds to step 276. At step 276, the controller 22 determines whether the temperature of the interior 12 ("InCarTemp") is greater than, or less than or equal to, a certain value ("21.20414"). If the controller 22 determines that the temperature is greater than the certain value ("InCarTemp>21.20414"), then the controller 22 proceeds to step 278 and does not activate the heating element 18 or deactivates the heating element 18 if previously already automatically activated by the controller 22. However, if the controller 22 determines that the temperature of the interior is less than or equal to the certain value ("InCarTemp<=21.20414"), then the controller 22 proceeds to step 280. At step 280, the controller 22 determines whether the front passenger side temperature set point ("Front_Rt_Temp_Setpt") is less than or equal to, or greater than, a certain value ("140.9863"). If the controller 22 determines that the front passenger side temperature set point is less than or equal to the certain value ("Front_Rt_Temp_Setpt<=140.9863"), then the controller 22 proceeds to step 282 and does not activate the heating element 18 or deactivates the heating element 18 if previously already automatically activated by the controller 22. However, if the controller 22 determines that the front passenger side temperature set point is greater than the certain value ("Front_Rt_Temp_Setpt>140.9863"), then the controller 22 proceeds to step 284. At step 284, the controller 22 determines whether a rear window defrost has been activated ("Overriding_ModeReq"). If the controller 22 determines that the rear window defrost has not been activated ("Overriding_ModeReq<=1.898305," meaning "FALSE"), then the controller 22 proceeds to step 286 and does not activate the heating element 18 or deactivates the heating element 18 if previously already automatically activated by the controller 22. However, if the controller 22 determines that the rear window defrost has been activated ("Overriding_ModeReq>1.898305," meaning "TRUE"), then the controller 22 proceeds to step 288 and activates the heating element 18.

Referring back to step 258, if the controller 22 determines that the ambient temperature is less than or equal to the certain temperature ("AirAmb_Te_Actl<=6.652516"), then the controller 22 proceeds to step 290. At step 290, the controller 22 determines whether the temperature of the interior 12 ("InCarTemp") is greater than, or less than or equal to, a certain value ("21.99206"). If the controller 22 determines that the temperature of the interior 12 is greater than the certain value ("InCarTemp>21.99206"), then the controller 22 proceeds to step 292. At step 292, the controller 22 determines whether the front passenger side temperature set point ("Front_Rt_Temp_Setpt") is less than or equal to, or greater than, a certain value ("140.9863"). If the controller 22 determines that the front passenger side temperature set point is less than or equal to the certain value ("Front_Rt_Temp_Setpt<=140.9863"), then the controller 22 proceeds to step 294 and does not activate the heating element 18 or deactivates the heating element 18 if previously already automatically activated by the controller 22. However, if the controller 22 determines that the front passenger side temperature set point is greater than the certain value ("Front_Rt_Temp_Setpt>140.9863"), then the controller 22 proceeds to step 296. At step 296, the controller 22 determines whether the ambient temperature ("AirAmb_Te_Actl") is greater than, or less than or equal to, a certain value ("5.568714"). If the controller 22 determines that the ambient temperature is greater than the certain value ("AirAmb_Te_Actl>5.568714"), then the controller 22 proceeds to step 298 and does not activate the heating element 18 or deactivates the heating element 18 if previously already automatically activated by the controller 22. However, if the controller 22 determines that the ambient temperature is less than or equal to the certain temperature ("AirAmb_Te_Actl<=5.568714"), then the controller proceeds to step 300. At step 300, the controller 22 determines whether the time of day is a morning hour ("isMorning"). If the controller 22 determines that the time of day is not a morning hour ("isMorning<=0," meaning FALSE), then the controller 22 proceeds to step 302. At step 302, the controller 22 determines whether the temperature of the interior 12 ("InCarTemp") is less than or equal to, or greater than, a certain value ("22.41667"). If the controller 22 determines that the temperature of the interior 12 is less than or equal to the certain value ("InCarTemp<=22.41667"), then the controller 22 proceeds to step 304 and activates the heating element 18. However, if the controller 22 determines that the temperature of the interior 12 is greater than the certain value ("InCarTemp>22.41667"), then the controller 22 proceeds to step 306 and does not activate the heating element 18 or deactivates the heating element 18 if previously already automatically activated by the controller 22.

Referring back to step 300, if the controller 22 determines that the time of day is a morning hour ("isMorning>0," meaning "TRUE"), then the controller 22 proceeds to step 308. At step 308, the controller 22 determines whether the vehicle 10 speed ("Veh_V_ActlEng_UB") is less than or equal to, or greater than, a certain value. If the controller 22 determines that the vehicle 10 speed is less than or equal to the certain value ("Veh_V_ActlEng_UB<=106.6641"), then the controller 22 proceeds to step 310 and does not activate the heating element 18 or deactivates the heating element 18 if previously already automatically activated by the controller 22. However, if the controller 22 determines that the vehicle 10 speed is greater than the certain value ("Veh_V_ActlEng_UB>106.6641"), then the controller 22 proceeds to step 312 and activates the heating element 18.

Referring back to step 290, if the controller 22 determines that the temperature of the interior 12 is less than or equal to the certain value ("InCarTemp<=21.99206"), then the controller 22 proceeds to step 314. At step 314, the controller 22 determines whether the front passenger side temperature set point ("Front_Rt_Temp_Setpt") is less than or equal to, or greater than, a certain value ("140.1316"). If the controller 22 determines that the front passenger side temperature set point is greater than the certain value ("Front_Rt_Temp_Setpt>140.1316), then the controller 22 proceeds to step 316. At step 316, the controller 22 determines whether a rear window defrost has been activated ("Overriding_ModeReq"). If the controller 22 determines that the rear window defrost has not been activated ("Overriding_ModeReq<=1.428571," meaning "FALSE"), then the controller 22 proceeds to step 318 and does not activate the heating element 18 or deactivates the heating element 18 if previously already automatically activated by the controller 22. However, if the controller 22 determines that the rear window defrost has been activated ("Overriding_ModeReq>1.428571," meaning "TRUE"), then the controller 22 proceeds to step 320 and activates the heating element 18.

Referring back to step 314, if the controller 22 determines that the front passenger side temperature set point is less than or equal to the certain value ("Front_Rt_Temp_Setpt 140.1316"), then the controller 22 proceeds to step 322. At step 322, the controller 22 determines whether the vehicle 10 speed ("Veh_V_ActlEng") is less than or equal to, or greater than, a certain value ("0.4081633"). If the controller 22 determines that the vehicle 10 speed is less than or equal to the certain value ("Veh_V_ActlEng<=0.4081633"), then the controller 22 proceeds to step 324 and activates the heating element 18. However, if the controller 22 determines that the vehicle 10 speed is greater than the certain value ("Veh_V_ActlEng>0.4081633"), then the controller 22 proceeds to step 326. At step 326, the controller 22 determines whether the time of day is a morning hour ("isMorning"). If the controller 22 determines that the time of day is a morning hour ("isMorning>0"), then the controller 22 proceeds to step 328 and does not activate the heating element 18 or deactivates the heating element 18 if previously already automatically activated by the controller 22. However, if the controller 22 determines that the time of day is not a morning hour ("isMorning<=0"), then the controller 22 proceeds to step 330. At step 330, the controller 22 determines whether the climate control system in the vehicle 10 is blowing air ("RCCM_Fr_Rr_Blower_Req") at a level that is less than or equal to, or greater than, a certain value ("0.9537572"). If the controller 22 determines that the climate control system in the vehicle 10 is blowing air at a level that is less than or equal to the certain value ("RCCM_Fr_Rr_Blower_Req<=0.9537572"), then the controller 22 proceeds to step 332 and does not activate the heating element 18 or deactivates the heating element 18 if previously already automatically activated by the controller 22. However, if the controller 22 determines that the climate control system in the vehicle 10 is blowing air at a level that is greater than the certain value ("RCCM_Fr_Rr_Blower_Req>0.9537572"), then the controller 22 proceeds to step 334. At step 334, the controller 22 determines whether the ambient temperature ("AirAmb_Te_Actl") is less than or equal to, or greater than, a certain value ("5.457317"). If the controller 22 determines that the ambient temperature is less than or equal to the certain value ("AirAmb_Te_Actl<=5.457317"), then the controller 22 proceeds to step 336 and activates the heating element 18. However, if the controller 22 determines that the ambient temperature is greater than the certain value ("AirAmb_Te_Actl>5.457317"), then the controller 22 proceeds to step 338 and does not activate the heating element 18 or deactivates the heating element 18 if previously already automatically activated by the controller 22.

The Pre-established Predictive Level Model(s), which establishes rules and governs the level of heating of the heating element 18, can be formed pursuant to a neural net analysis or a multilayer perceptron classifier analysis of input data, relating to the Certain Identifiable Conditions, collected from the Test Vehicles as a whole or segmented, as explained above. There are a variety of analyses that can provide useful results, including the R (Version 3.2.5) statistic programming software and the MultilayerPerceptron classified through Weka (available at http://weka.sourceforge.net/doc.stable/weka/classifiers/functions/MultilayerPerceptron.html). There are other analyses available and this is not meant to be an exhaustive list. The rules of the Pre-established Predictive Level Model(s) then govern the level, via the controller 22, at which the heating element 18 imparts heat to the external surface 20 of the steering wheel 14 as a function of input data to the controller 22 relating to the Certain Identifiable Conditions present in the vehicle 10.

The method can further comprise automatically deactivating the heating element 18 pursuant to the Pre-established Predictive Activation Model, after initially automatically activating the heating element 18 pursuant to the Pre-established Predictive Activation Model, if the collected data relating to the Certain Identifiable Conditions collected after initially automatically activating the heating element 18 satisfy the rules of the Pre-established Predictive Activation Model for deactivation of the heating element 18. For example, using the Pre-established Predictive Activation Model formed pursuant to the C.50 program set forth above, the controller 22 would initially automatically activate the heating element 18 if the temperature of the interior 12 was less than or equal to a certain value ("InCarTemp<=20.94798"), the climate control system in the vehicle 10 is blowing air at a level that is less than or equal to a certain value ("RCCM_Fr_Rr_Blower_Req<=0.04545455"), the "coldInside20" condition was not satisfied ("coldInside20<=0," meaning "FALSE"), and the temperature of the interior 12 is greater than a certain value ("InCarTempQF>2.763158"). However, if the controller 22 receives input that all the other conditions are still satisfied, but the temperature of the interior 12 is now less than or equal to the certain value ("InCarTempQF<=2.763158"), then the controller 22 deactivates the heating element 18.

The method of controlling the heating element 18 can further comprise automatically reactivating the heating element 18 pursuant to the Pre-established Predictive Activation Model(s), after automatically deactivating the heating element 18 pursuant to the Pre-established Predictive Activation Model, if the collected data relating to the Certain Identifiable Conditions collected after deactivating the heating element 18 again satisfy the rules for activation pursuant to the Pre-established Predictive Activation Model(s). The controller 22 can continue to collect data relative to the Certain Identifiable Conditions while the triggering event (see step 46 above) remains valid (i.e., the vehicle 10 is still moving) and compare the collected data to the rules of the Pre-established Predictive Activation Model. If the collected data once again satisfy the rules of the Pre-established Predictive Activation Model to activate the heating element 18, then the controller 22 can reactivate the heating element 18 accordingly. For example, again using the example Pre-established Predictive Activation Model set forth above, if the controller 22 subsequently again receives input data relating to the Certain Identifiable Conditions that satisfy the rules of the Pre-established Predictive Activation Model for activation of the heating element 18, such as the temperature of the interior 12 is again being greater than the certain value ("InCarTempQF>2.763158"), then the controller 22 reactivates the heating element 18. In other words, the controller 22 accepts input data relating to the Certain Identifiable Conditions in "real-time" and dynamically considers whether the input data satisfies any of the rules of the Pre-established Predictive Activation Model(s) for activation or deactivation of the heating element 18, and controls the activation/deactivation of the heating element 18 accordingly.

The method of controlling the heating element 18 can further comprise an occupant of the vehicle 10, such as an occupant of the seating assembly 16, manually deactivating the heating element 18 via the user interface 30 (see FIG. 3A). For example, the occupant of the seating assembly 16 could press the button 34 labeled "OFF" on the touch screen display 32 to manually deactivate the heating element 18 that the controller 22 had previously activated automatically pursuant to the Pre-established Predictive Activation Model. The controller 22 accepts this interface as input and consequently deactivates the heating element 18.

The method of controlling the heating element 18 can further comprise, upon the occupant of the vehicle 10 manually deactivating the heating element 18 via the user interface 30, recalibrating the Pre-established Predictive Activation Model into a New Predictive Activation Model accounting for the collected data relating to the Certain Identifiable Conditions existing when the occupant manually deactivated the heating element 18, and thus, establishing new rules for activation and deactivation of the heating element 18. To do so, the controller 22 can be pre-loaded with software to perform classification and regression tree analyses, such as the mentioned C.50 program. The occupant's manual deactivation of the heating element 18 that had been automatically activated by the controller 22 pursuant to the Pre-established Predictive Activation Model constitutes the occupant's rejection of the rule of the Pre-established Predictive Activation Model (and therefore the Certain Identifiable Conditions satisfying the rule) the controller 22 relied upon to automatically activate the heating element 18. For example, using this rule of Pre-established Predictive Activation Model set forth above—

```
InCarTemp <= 20.94798:
:...RCCM_Fr_Rr_Blower_Req <= 0.04545455:
:  :...coldInside20 <= 0:
:  :  :...InCarTempQF <= 2.763158: 0 (2)
:  :  :  InCarTempQF > 2.763158: 1 (33/7)
``` the controller 22 would automatically activate the heating element 18 if the controller 22 receives input that the temperature of the interior 12 is less than or equal to a certain value ("InCarTemp<=20.94798"), the climate control system in the vehicle 10 is blowing air at a level that is less than or equal to a certain value ("RCCM_Fr_Rr_Blower_Req<=0.04545455"), the "coldInside20" condition was not satisfied ("coldInside20<=0," meaning "FALSE"), and the temperature of the interior 12 is greater than a certain value ("InCarTempQF>2.763158"). However, if the controller 22 automatically activates the heating element 18 and the occupant rejects the activation by manually deactivating the heating element 18 via the user interface 30, then the controller 22 recalibrates the Pre-established Predictive Activation Model into a New Predictive Activation Model, accounting for the data related to the Certain Identifiable Conditions existing when the occupant manually deactivated the heating element 18. The New Predictive Activation Model can weigh the occupant's decision heavily such that when the Certain Identifiable Conditions that existed when the occupant manually deactivated the heating element 18 exist again, the controller 22 would not activate the heating element 18 and would deactivate automatically the heating element 18 if the heating element 18 was activated. In other words, the New Predictive Activation Model can include a rule, as a function of those Certain Identifiable Conditions, deactivating or not activating the heating element 18. Alternatively, the New Predictive Activation Model can weigh the data related to the Certain Identifiable Conditions existing when the occupant manually deactivated the heating element 18 the same as the data collected from the Test Vehicles, from which the Pre-established Predictive Activation Model was originally derived. In any case, the New Predictive Activation Model will continue to utilize the data collected from the Test Vehicles as well as the data collected from the vehicle 10 relating to the Certain Identifiable Conditions existing when the occupant manually deactivated the heating element 18.

The method of controlling the heating element 18 can further comprise the occupant manually activating the heating element 18 via the user interface 30. For example, the occupant of the vehicle 10 could press the button 36 labeled "ON" on the touch screen display 32 (see FIG. 3B) to activate the heating element 18. The controller 22 accepts this interface as input and consequently activates the heating element 18 that the controller 22 either previously deactivated or did not activate pursuant to the Pre-established Predictive Activation Model (or New Predictive Activation Model).

The method of controlling the heating element 18 can further comprise recalibrating the New Predictive Activation Model into a Newer Predictive Activation Model accounting for the collected data relative to the Certain Identifiable Conditions existing when the occupant manually activated the heating element 18 and establishing new rules for activation and/or deactivation of the heating element 18, upon the occupant manually activating the heating element 18 via the user interface 30. The controller 22 records the data relative to the Certain Identifiable Conditions existing when the occupant manually activates the heating element 18 and prepares a Newer Predictive Activation Model with new rules for activation using the data. Again, the Newer Predictive Activation Model can weigh heavily the data relating to the Certain Identifiable Conditions existing when the occupant manually activated the heating element 18 with a new rule such that the controller 22 automatically activates the heating element 18 when those Certain Identifiable Conditions again exist. Alternatively, the Newer Predictive Activation Model can weigh the data relative to the Certain Identifiable Conditions existing when the occupant manually activated the heating element 18 the same as the other data previously relied upon to derive the Pre-established Predictive Activation Model. In general, the controller 22 continues to refine the predictive modeling (the Pre-established Predictive Activation Model and subsequent recalibrations thereof) by performing a new CART analysis based on the data relative to the Certain Identifiable Conditions whenever the occupant of the vehicle 10 manually activates or deactivates the heating element 18. Eventually, the predictive modeling will be refined according to the occupant's preferences and the occupant will no longer have the need to manually activate or deactivate the heating element 18—the predictive modeling will activate or deactivate the heating element 18 automatically to satisfy the occupant's preferences.

Refining the Pre-established Predictive Activation Model into the New Predictive Activation Model, the Newer Predictive Activation Model, and subsequent refinements thereof will identify the preferences of the occupant, including situations when the occupant desires the activation of the heating element 18 for reasons other than the in-vehicle 10 temperature or ambient temperature. For example, the occupant may desire the heating element 18 to impart heat to the occupant's hands during the first several minutes on a commute to work, for therapeutic reasons. As another example, the occupant (operating the vehicle 10) may desire the heating element 18 to impart heat during the spring on weekend days (to ensure the occupant's comfort) when the front passenger side set point temperature is below a certain temperature (to ensure a passenger's comfort), as a compensation effect to compensate for the blown cooled air attempting to satisfy the front passenger side set point temperature. A CART analysis of the collected data relating to the Certain Identifiable Conditions will learn this behavior and eventually automatically activate and deactivate the heating element 18 accordingly. The CART analysis is thus a learning algorithm that provides a high degree of accuracy because the Certain Identifiable Conditions are considered across the entire history of the vehicle 10. Other possible non-learning methods, such as those involving weighted averages, will not be as accurate and will not account for time/day/season dependent behavior.

The method of controlling the heating element 18 can further comprise determining, by comparing the collected data to the rules of the Pre-established Predictive Level Model, which level of the several different levels of heating the controller 22 will initially automatically set for the heating element 18 and initially automatically setting the heating element 18 to the determined level. In other words, when the controller 22 determines, based on the Pre-established Predictive Activation Model (or New Predictive Activation Model or Newer Predictive Activation Model) to automatically activate the heating element 18, the controller 22 additionally determines, based on the Pre-established Predictive Level Model and the data relating to the Certain Identifiable Conditions, which level at which to set the heating element 18 (e.g., low, medium, or high). While the heating element 18 remains activated, the controller 22 dynamically compares the collected data to the rules of the Pre-established Predictive Level Model and adjusts the level of the heating element 18 accordingly. If the rules of the Pre-established Predictive Level Model, based on the collected data after the activation of the heating element 18, dictates that the heating level of the heating element 18 be changed, the controller 22 thus causes the heating element 18 to impart heat according to the level prescribed by the Pre-established Predictive Level Model.

The method of controlling the heating element 18 can further comprise the occupant of the vehicle 10 manually changing the level of heating for the heating element 18 via the user interface 30. For example, the controller 22, pursuant to the Pre-established Predictive Level Model, could have initially set the heating element 18 to heat at level 3 (HIGH) and the occupant could subsequently press the button 42 labeled "LOW" on the touch screen display 32 to cause the heating element 18 to impart heat at the relatively lower level. The controller 22 accepts this interface as input and consequently causes the heating element 18 to heat at this relatively low level.

The method of controlling the heating element 18 can further comprise recalibrating the Pre-established Predictive Level Model into a New Predictive Level Model accounting for the collected data relative to the Certain Identifiable Conditions existing when the occupant manually changed the level of heating and establishing new rules governing the level of heating for the heating element 18 when the heating element 18 is automatically activated, upon the occupant manually changing the level of heating for the heating element 18 via the user interface 30. The controller 22 records the data relative to the Certain Identifiable Conditions existing when the occupant manually changed the level of heating and prepares a New Predictive Level Model accounting for these Certain Identifiable Conditions. In general, the controller 22 continues to refine the predictive modeling governing the level of temperature altering by performing a new neural net analysis or a multilayer perceptron classifier analysis including the collected data relative to the Certain Identifiable Conditions whenever the occupant manually alters the level of heating for the heating element 18. The multilayer perceptron classifier analysis, like the CART analysis, is thus a learning algorithm that provides a high degree of accuracy because the Certain Identifiable Conditions are considered across the entire history of the vehicle 10. Other possible non-learning methods, such as those involving weighted averages, will not be as accurate.

The method of controlling the heating element 18 can further comprise, after the occupant manually changes the level of heating, automatically deactivating the heating element 18 and then automatically reactivating the heating element 18. When the controller 22 automatically reactivates the heating element 18 pursuant to the Pre-established Predictive Activation Model (or recalibrated version thereof), the method can further comprise determining, by comparing the collected data to the New Predictive Level Model, which level of the several different levels of heating the controller 22 will initially automatically set for the heating element 18 and automatically setting the heating element 18 to the determined level. In other words, in a subsequent session of automatic activation of the heating element 18, the controller 22 utilizes the rules of the New Predictive Level Model to determine at which level of heating the heating element 18 will be set.

The method of controlling the heating element 18 can further comprise removing the occupant from using the steering wheel 14, occupying the seating assembly 16 with a second occupant who is or will be using the steering wheel 14, and recognizing that the second occupant is different than the first occupant. The controller 22 can determine that the second occupant, different than the first occupant, is occupying the seating assembly 16 and using the steering wheel 14 in various ways, such as by the weight of the second occupant as measured by the seating assembly 16 compared to the weight of the first occupant. Alternatively, the second occupant can instruct the controller 22 via the user interface 30 (such as by selecting a user profile dedicated to the second occupant) that the second occupant rather than the first occupant is occupying the seating assembly 16 and will be or is using the steering wheel 14 with the heating element 18.

The method of controlling the heating element 18 can further comprise collecting data relative to the Certain Identifiable Conditions while the second occupant is using the steering wheel 14 and determining, by comparing only the data collected while the second occupant is occupying the vehicle 10 (and using the steering wheel 14), and not the data collected when the first occupant was occupying the vehicle 10 (and using the steering wheel 14), to the rules of the Pre-established Predictive Activation Model, whether data collected satisfy the rules of the Pre-established Predictive Activation Model so as to initially automatically activate the heating element 18. In other words, the controller 22 recognizes that the second occupant is using the steering wheel 14 and begins anew with the Pre-established Predictive Activation Model, rather than the predictive activation model recalibrated to account for the first occupant's manual activations or deactivations of the heating element 18 (such as the New Predictive Activation Model or a subsequent recalibrated version thereof). Therefore, only the second occupant's manual activations and deactivations of the heating element 18 will cause recalibration of the Pre-established Predictive Activation Model into subsequent predictive models. The method of controlling the heating element 18 can further comprise initially automatically activating the heating element 18 while the second occupant is using the steering wheel 14. In other words, the controller 22, comparing the data collected relating to the Certain Identifiable Conditions to the rules of the Pre-established Predictive Activation Model, can subsequently activate the heating element 18 accordingly while the second occupant is using the steering wheel 14 to impart heat as the data collected and the rules of the Pre-established Predictive Activation Model dictate.

The methods of automatically controlling the activation/deactivation of the heating element 18 pursuant to the Pre-established Predictive Activation Model and the level of heating pursuant to the Pre-established Predictive Level Model (and subsequent recalibrated iterations thereof) provide advantages over other methods that control all means of temperature control in a vehicle (such as blower level, temperature set points, etc.). For example, the user of the steering wheel 14 may simply desire the controller 22 to exercise automatic control of the heating element 18 in the steering wheel 14, but not automatic control over the entire climate in the interior 12 of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of controlling a heating element within a steering wheel of a vehicle comprising:
   presenting a vehicle comprising:
   a steering wheel including a heating element;
   a controller in communication with the heating element, the controller including a Pre-established Predictive Activation Model setting forth rules governing activation of the heating element as a function of data relating to Certain Identifiable Conditions; and
   a user interface configured to allow the heating element to be manually activated or deactivated;
   collecting data relating to the Certain Identifiable Conditions;
   determining, by comparing the collected data to the rules of the Pre-established Predictive Activation Model, whether the collected data satisfies the rules of the Pre-established Predictive Activation Model so as to initially automatically activate the heating element; and
   automatically activating the heating element.

2. The method of claim 1,
   wherein, the Pre-established Predictive Activation Model was formed pursuant to a classification and regression tree analysis of input data related to the Certain Identifiable Conditions collected from other operators of other vehicles.

3. The method of claim 1,
   wherein, the Pre-established Predictive Activation Model establishes rules that are a function of at least the following Certain Identifiable Conditions: a temperature of the interior of the vehicle and a temperature outside of the vehicle.

4. The method of claim 3,
   wherein, the Pre-established Predictive Activation Model establishes rules that are a function of at least the following additional Certain Identifiable Conditions: a level at which a climate control system in the vehicle is blowing air and a front user side temperature set point.

5. The method of claim 4,
   wherein, the Pre-established Predictive Activation Model establishes rules that are a function of at least the following additional Certain Identifiable Conditions: a time of the day; and a temperature differential between the temperature of the interior of the vehicle and the temperature outside of the vehicle.

6. The method of claim 3,
   wherein, when the temperature of the interior of the vehicle is below a certain temperature, the controller automatically activates the heating element pursuant to the rules of the Pre-established Predictive Activation Model as a function of data relating to at least one other of the Certain Identifiable Conditions excluding the temperature of the interior of the vehicle.

7. The method of claim 6,
   wherein, when a passenger side temperature set point is greater than a certain value, the controller automatically activates the heating element, but when the passenger side temperature set point is less than a certain value, the controller does not automatically activate the heating element.

8. The method of claim 6,
   wherein, according to the rules of the Pre-established Predictive Activation Model, the controller activates the heating element if a heated seat function has not been activated, but the controller does not activate the heating element if the heated seat function has been activated.

9. The method of claim 6,
   wherein, according to the rules of the Pre-established Predictive Activation Model, the controller activates the heating element if the level at which a climate control system in the vehicle is blowing air is greater than a certain level; and
   wherein, according to the rules of the Pre-established Predictive Activation Model, the controller does not activate the heating element if the level at which the climate control system in the vehicle is blowing air is less than a certain level.

10. The method of claim 1 further comprising:
    automatically deactivating the heating element pursuant to the Pre-established Predictive Activation Model, after initially automatically activating the heating element pursuant to the Pre-established Predictive Activation Model, if the collected data relating to the Certain Identifiable Conditions collected after initially automatically activating the heating element satisfy the rules of the Pre-established Predictive Activation Model for deactivation of the heating element.

11. The method of claim 10 further comprising:
    automatically reactivating the heating element pursuant to the Pre-established Predictive Activation Model, after automatically deactivating the heating element pursuant to the Pre-established Predictive Activation Model, if the collected data relating to the Certain Identifiable Conditions collected after deactivating the heating element again satisfy the rules for activation pursuant to the Pre-established Predictive Activation Model.

12. The method of claim 11 further comprising:
    a first occupant of the vehicle manually deactivating the heating element via the user interface.

13. The method of claim 12 further comprising:
    upon the first occupant manually deactivating the heating element via the user interface, recalibrating the Pre-established Predictive Activation Model into a new predictive activation model accounting for the collected data relating to the Certain Identifiable Conditions existing when the first occupant manually deactivated the heating element and establishing new rules for activation and/or deactivation of the heating element.

14. The method of claim 13 further comprising:
    the first occupant manually activating the heating element via the user interface.

15. The method of claim 14 further comprising:
    upon the first occupant manually activating the heating element via the user interface, recalibrating the new predictive activation model into a newer predictive activation model accounting for the collected data relative to the Certain Identifiable Conditions existing when the first occupant manually activated the heating element and establishing new rules for activation and/or deactivation of the heating element.

16. The method of claim 15,
    the heating element being adjustable to several different levels of heating;
    the controller further including a Pre-established Predictive Level Model establishing rules governing which level of the several different levels of heating the controller will initially automatically set for the heating element, the rules of the Pre-established Predictive Level Model being a function of one or more of the Certain Identifiable Conditions; and the user interface further configured to allow the first occupant to select manually the level of the several different levels of heating;

the method further comprising:

determining, by comparing the collected data to the rules of a Pre-established Predictive Level Model, which level of the several different levels of heating the controller will initially automatically set for the heating element; and initially automatically setting the heating element to the determined level.

17. The method of claim 16, wherein, the Pre-established Predictive Level Model is formed pursuant to a multilayer perceptron classifier analysis of input data relating to the Certain Identifiable Conditions collected from other vehicles.

18. The method of claim 17 further comprising:

the first occupant manually changing the level of heating for the heating element via the user interface.

19. The method of claim 18 further comprising:

upon the first occupant manually changing the level of heating for the heating element via the user interface, recalibrating the Pre-established Predictive Level Model into a new predictive level model accounting for the collected data relative to the Certain Identifiable Conditions existing when the first occupant manually changed the level of heating and establishing new rules governing the level of heating for the heating element when the heating element is automatically activated;

automatically deactivating the heating element;

automatically reactivating the heating element;

determining, by comparing the collected data to the rules of the new predictive level model, which level of the several different levels of heating the controller will initially automatically set for the heating element; and automatically setting the heating element to the determined level.

20. The method of claim 19 further comprising:

removing the first occupant from using the steering wheel;

occupying the vehicle with a second occupant who is using the steering wheel;

recognizing that the second occupant is different than the first occupant;

collecting data relative to the identifiable conditions while the second occupant is using the steering wheel;

determining, by comparing only the data collected while the second occupant is using the steering wheel, and not the data collected when the first occupant was using the steering wheel, to the rules of the Pre-established Predictive Activation Model, whether data collected satisfy the rules of the Pre-established Predictive Activation Model so as to initially automatically activate the heating element; and initially automatically activating the heating element while the second occupant is using the steering wheel.

* * * * *